United States Patent
Galloway

(10) Patent No.: US 9,851,011 B2
(45) Date of Patent: Dec. 26, 2017

(54) SNORKEL VALVE

(71) Applicant: MACTAGGART SCOTT (HOLDINGS) LIMITED, Loanhead (GB)

(72) Inventor: Eric Galloway, Loanhead (GB)

(73) Assignee: MACTAGGART SCOTT (HOLDINGS) LIMITED, Loanhead (GB)

( * ) Notice: Subject to any disclaimer, the term of this patent is extended or adjusted under 35 U.S.C. 154(b) by 0 days.

(21) Appl. No.: 15/116,615

(22) PCT Filed: Jun. 1, 2015

(86) PCT No.: PCT/GB2015/051584
§ 371 (c)(1),
(2) Date: Aug. 4, 2016

(87) PCT Pub. No.: WO2015/185901
PCT Pub. Date: Dec. 10, 2015

(65) Prior Publication Data
US 2017/0152952 A1 Jun. 1, 2017

(30) Foreign Application Priority Data
Jun. 2, 2014 (GB) .................................. 1409726.5

(51) Int. Cl.
*B63G 8/36* (2006.01)
*F16K 1/12* (2006.01)
*F16K 31/122* (2006.01)

(52) U.S. Cl.
CPC ................ *F16K 1/123* (2013.01); *B63G 8/36* (2013.01); *F16K 31/122* (2013.01)

(58) Field of Classification Search
CPC .......... B63J 2/10; F16K 3/265; F16K 31/122; F16K 1/123; B63G 8/36
See application file for complete search history.

(56) References Cited

U.S. PATENT DOCUMENTS 726,947 A 5/1903 Lake
3,411,427 A * 11/1968 Graham ..................... B63J 2/10
454/10

(Continued)

FOREIGN PATENT DOCUMENTS

DE  10 2012 208758  9/2013
EP  1 468 906  10/2004

(Continued)

OTHER PUBLICATIONS

International Search Report and Written Opinion of the ISA for PCT/GB2015/051584, dated Jan. 13, 2016, 25 pages.

(Continued)

*Primary Examiner* — Andrew Polay
(74) *Attorney, Agent, or Firm* — Nixon & Vanderhye P.C.

(57) ABSTRACT

The invention provides a snorkel valve (2) for controlling a flow of fluid into a deployable submarine mast, the snorkel valve comprising: a valve body (30) having: a tubular wall having an outer surface and an inner surface on the reverse side of the outer surface, the inner surface defining an inner bore (32); a valve inlet (38) extending through the tubular wall to fluidly connect the outer surface and the inner bore; and a valve outlet (40) in fluid communication with the inner bore, and a sleeve (42) slidable within the said inner bore between a closed position in which it covers the said valve inlet to thereby inhibit water from flowing into the inner bore through the valve inlet, and an open position in which at least a portion of the said valve inlet is uncovered by the sleeve to thereby allow air to flow into the said inner bore through the said valve inlet.

20 Claims, 7 Drawing Sheets

(56) References Cited

U.S. PATENT DOCUMENTS

| | | |
|---|---|---|
| 3,863,584 A | 2/1975 | Wilkins |
| 4,611,551 A | 9/1986 | Ferguson et al. |
| 2004/0169917 A1 | 9/2004 | Wantig et al. |
| 2004/0200399 A1 | 10/2004 | Abdel-Maksoud et al. |
| 2011/0132479 A1 | 6/2011 | Ré |

FOREIGN PATENT DOCUMENTS

| | | | | |
|---|---|---|---|---|
| EP | 2 540 614 A1 | 1/2013 | | |
| GB | 187205 | 8/1922 | | |
| GB | 533560 A | * 2/1941 | ................ | B63J 2/10 |
| GB | 2 191 845 | 12/1987 | | |
| JP | S62-122236 | 8/1987 | | |

OTHER PUBLICATIONS

International Preliminary Report on Patentability, dated May 10, 2016, 6 pages.
K. M. Heggstad, "A Unique Snorkel Design", Naval Engineers Journal, Jun. 1, 1965, vol. 77, No. 3, pp. 449-455.

\* cited by examiner

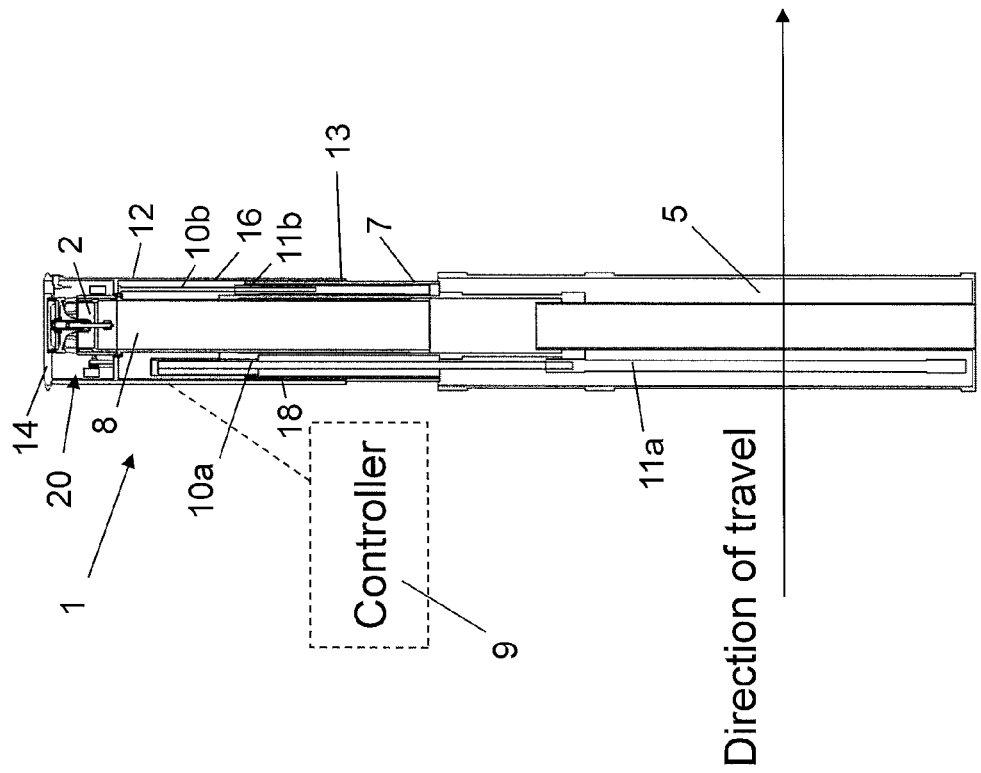
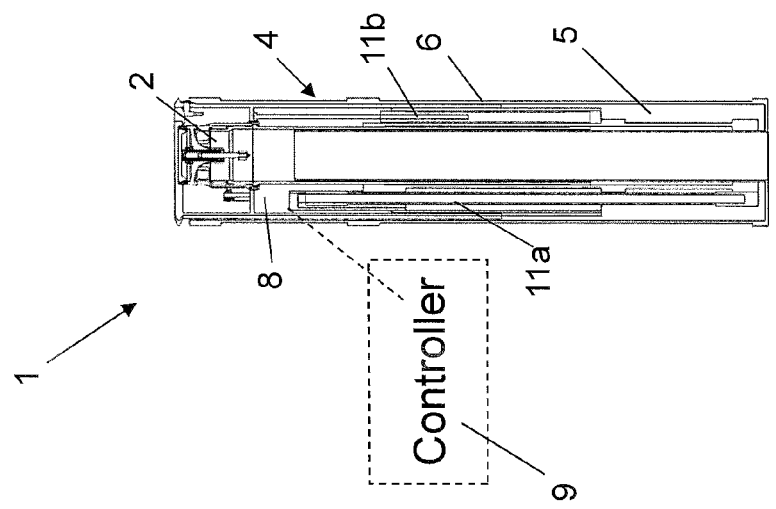
Fig. 1b
Fig. 1a

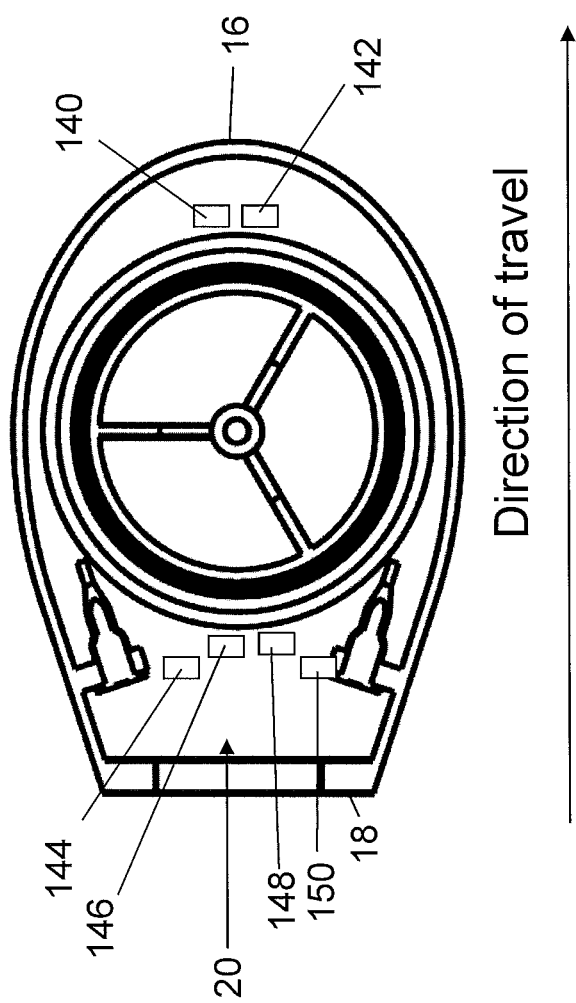

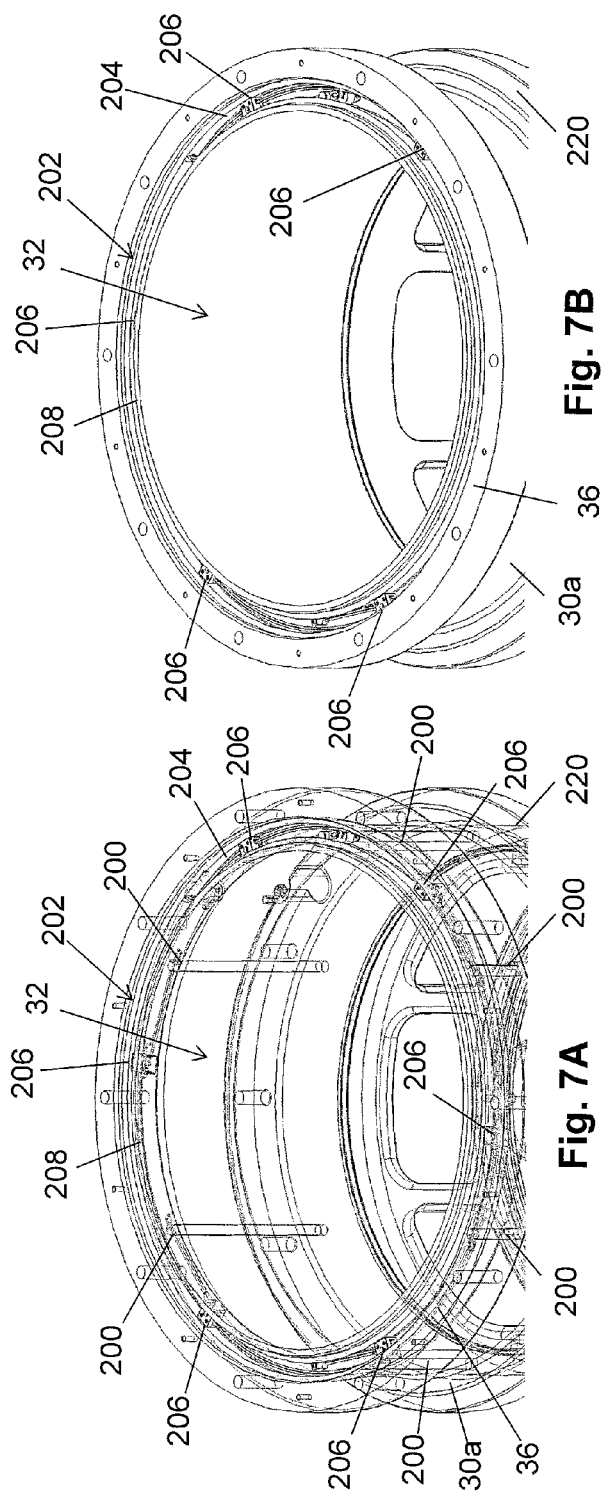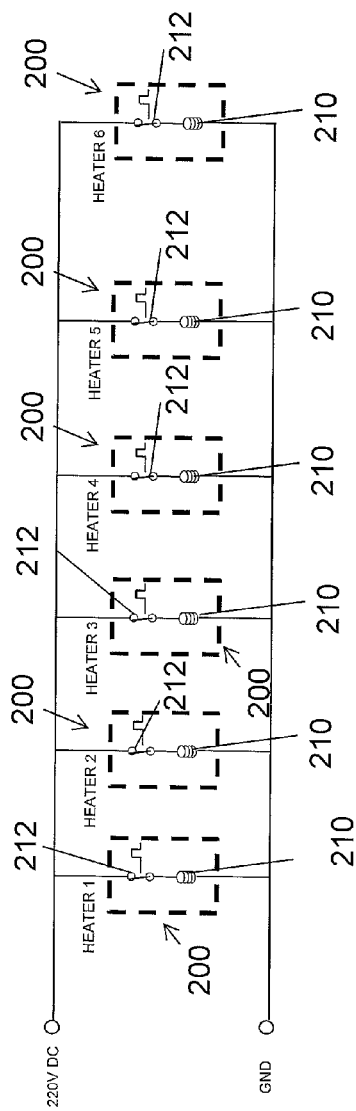

SNORKEL VALVE

This application is the U.S. national phase of International Application No. PCT/GB2015/051584 filed 1 Jun. 2015, which designated the U.S. and claims priority to GB Patent Application No. 1409726.5 filed 2 Jun. 2014, the entire contents of each of which are hereby incorporated by reference.

FIELD OF THE INVENTION

The invention relates to a snorkel valve, a deployable mast assembly comprising a snorkel valve, a submarine comprising a snorkel valve, a submarine comprising a deployable mast assembly comprising a snorkel valve and a method of operating a snorkel valve.

BACKGROUND TO THE INVENTION

Submarines typically comprise a pressure hull and a sail extending vertically upwards from the pressure hull, both of the pressure hull and sail typically being submerged in water below a water to air interface in normal use. The sail typically comprises a chamber storing one or more deployable masts, such as telecommunications antennae, an air induction tube for drawing in air for an internal combustion process in a diesel engine and an exhaust tube for the diesel engine. In order to use (at least) these masts, the submarine rises close to the water surface in a "snorkelling mode" before deploying the mast such that at least part of the mast protrudes above the water surface.

The mast comprising the air induction tube has an upper portion which protrudes above the water surface when the submarine is in snorkelling mode. The said upper portion comprises an air inlet port for receiving air into the air induction tube from above the water surface. The air inlet port on the mast is typically always open, and a snorkel valve is provided inside the mast, adjacent to the air inlet port, to control the ingress of water into the air induction tube. Typically the snorkel valve is a butterfly valve comprising a disk mounted on a rotatable stem, the disk being pivotable about a pivot axis defined by the longitudinal axis of the stem between a closed position and an open position. In the closed position, the disk covers the valve inlet and engages an annular gasket extending around the perimeter of the valve inlet. In the open position, the disk is pivoted about the pivot axis so as to disengage the gasket, and uncover a portion of the valve inlet.

Although butterfly valves are an established technology, they have a number of disadvantages. The shaft needs to be sealed (particularly when the disk is in the valve closed position) and, as the shaft is moveable (rotatable about the pivot axis), this seal is prone to wear. Furthermore, even when the disk is in the fully open position, the disk and the shaft cover a portion of the inlet, thereby restricting flow through the inlet. In addition, obstructions between the disk and the gasket can prevent the disk from returning to the closed position from the open position.

SUMMARY OF THE INVENTION

A first aspect of the invention provides a snorkel valve for controlling a flow of fluid into a deployable submarine mast, the snorkel valve comprising:

a valve body having: a tubular wall having an outer surface and an inner surface on the reverse side of the outer surface, the inner surface defining an inner bore;
a valve inlet extending through the tubular wall to fluidly connect the outer surface and the inner bore; and
a valve outlet (different from the valve inlet) in fluid communication with the inner bore, and
a sleeve slidable within the said inner bore between a closed position in which it (typically fully) covers the said valve inlet to thereby inhibit (e.g. restrict or prevent) water from flowing (e.g. from the outer surface) into the inner bore through the valve inlet, and an open position in which at least a portion (preferably all) of the said valve inlet is uncovered by the sleeve to thereby allow air to flow (e.g. from the outer surface) into the said inner bore through the said valve inlet (and out of the inner bore through the said valve outlet).

By inhibiting water from entering the inlet by covering it with a sleeve slidable within the inner bore rather than, for example, a more traditional butterfly valve arrangement, the snorkel valve can be provided with a simplified sealing arrangement comprising a reduced number of moving seals (e.g. there is no shaft which needs to be sealed), and thus with a longer operating life. In addition, there are reduced restrictions (preferably none) in the flow path through the valve inlet when the sleeve is in the open position, thereby improving the flow of fluid through the valve.

Preferably the valve outlet is coaxial (and typically concentric) with the inner bore. Typically the inner bore (and typically the tubular wall of the valve body) terminates at the valve outlet.

Preferably the sleeve is guided by bearings provided on the inner surface of the tubular wall of the valve body as it moves between the open and closed positions.

Typically, a plurality of valve inlets are provided around the perimeter of the tubular wall of the valve body. Typically each of the valve inlets are at the same (or at substantially the same) axial position along the length of the tubular wall of the valve body. Typically the sleeve covers each of the valve inlets in the closed position. Typically the sleeve uncovers each of the valve inlets in the open position.

Typically the snorkel valve further comprises a (first) valve seal, the sleeve comprising a (first) sealing surface which sealingly engages the (first) valve seal when the sleeve is in the closed position.

The sealing engagement between the (first) valve seal and the (first) sealing surface of the sleeve typically prevents (or substantially prevents or at least restricts) water which enters (e.g. leaks into) the valve inlet when the sleeve is in the closed position from flowing along a path between the (first) sealing surface of the sleeve and the valve body (and therefore, when the valve is in use, prevents, or at least restricts, water from entering an air induction tube of a submarine to which the valve may be mounted).

The (first) valve seal is typically provided inside the valve body, preferably within the inner bore (e.g. at one end of the inner bore).

Typically the (first) valve seal is provided at an axial end of the inner bore, and the (first) sealing surface of the sleeve is provided at an axial end of the sleeve.

Typically the sleeve comprises a first axial end and a second axial end opposite the first axial end (in a direction parallel to the sliding axis). The first axial end of the sleeve typically comprises the (first) sealing surface.

The inner bore typically has a first axial end (which first axial end is typically adjacent to the valve inlet, or at least closer to the valve inlet than to the valve outlet) and a second axial end opposite the first axial end. Typically the first valve seal is provided at the first axial end of the inner bore. The second axial end of the inner bore may comprise the valve outlet.

Typically the first axial end of the sleeve engages the first axial end of the inner bore when the sleeve is in the closed position.

The (first) valve seal may comprise a resilient seal (e.g. a resilient sealing member such as a resilient sealing ring). The (first) valve seal may comprise an elastomeric ring. By making the (first) valve seal resilient, the seal cushions the sleeve at the end of its closing stroke. This reduces the noise produced when the valve closes, and reduces the likelihood of damage of the sleeve and the valve body. This also reduces the need for precise control over movement of the sleeve, which reduces the complexity of the valve design and control mechanism.

Preferably the snorkel valve further comprises a second valve seal, the sleeve comprising a second sealing surface which sealingly engages the second valve seal when the sleeve is in the closed position.

The second valve seal is typically comprised within the valve body. The sealing engagement between the second valve seal and the second sealing surface of the sleeve typically prevents (or at least substantially prevents or restricts) any water which enters (e.g. leaks into) the inlet when the sleeve is in the closed position from flowing along a path between the second sealing surface of the sleeve and the valve body (and therefore, when the valve is in use, prevents, or substantially prevents or at least restricts water from entering an air induction tube of a submarine to which the valve may be mounted).

Typically the second seal is provided within the inner bore. The second valve seal is typically provided at an intermediate axial position of the inner bore between the first and second ends of the inner bore.

The second sealing surface may comprise an outer surface of (a tubular wall of) the sleeve.

The second seal may comprise a resilient seal (e.g. a resilient sealing member, such as a resilient sealing ring, typically an elastomeric sealing ring).

The (inner surface and/or outer surface of the) tubular wall of the valve body may have a circular cross section (perpendicular to the sliding axis) along some or all of its axial length. However, it may be that the tubular wall of the valve body does not have a circular cross section (perpendicular to the sliding axis) along some or any of its axial length.

The inner bore may have a width (perpendicular to the sliding axis) which varies along its length (parallel to the sliding axis). The inner bore may have a first axial inner bore region having a first width (perpendicular to the sliding axis) and a second axial inner bore region having a second width (perpendicular to the sliding axis, in the same dimension as the first width) greater than the first width, the second axial inner bore region being axially offset from the first axial inner bore region (parallel to the sliding axis). An inner bore transition region typically extends axially between the first and second axial inner bore regions. For example, the inner bore transition region may comprise a tapered region which tapers up in width from the first axial inner bore region to the second axial inner bore region. In another example, the inner bore transition region comprises a step between the first and second axial inner bore regions. Typically the first axial inner bore region is closer to the first axial end of the inner bore than the second axial inner bore region is to the first axial end of the inner bore. Typically, the second axial inner bore region is closer to the second axial end of the inner bore than the first axial inner bore region is to the second axial end of the inner bore.

At least part of the second valve seal may be comprised in the inner bore transition region.

The sleeve may have a width (perpendicular to the sliding axis) which varies along its length (parallel to the sliding axis). The sleeve may have a first axial sleeve region having a first width (perpendicular to the sliding axis) and a second axial sleeve region having a second width (perpendicular to the sliding axis, in the same dimension as the first width) greater than the first width, the second axial sleeve region being axially offset from the first axial sleeve region (parallel to the sliding axis). Typically the first axial sleeve region is provided closer to the first axial end of the sleeve than the second axial sleeve region is to the first axial end of the sleeve. Typically the second axial sleeve region is provided closer to the second axial end of the sleeve than the first axial sleeve region is to the second axial end of the sleeve.

A sleeve transition region may be provided between the first and second axial sleeve regions. For example, the sleeve transition region may comprise a tapered sleeve region which tapers up in width from the first axial sleeve region to the second axial sleeve region. In another example, the sleeve transition region comprises a step between the first and second axial sleeve regions.

It may be that the sleeve transition region comprises the (second) sealing surface which sealingly engages the (second) seal when the sleeve is in the closed position. In this case, the (second) seal is preferably provided on the corresponding inner bore transition region. It may be that both the sleeve transition region and the inner bore transition regions comprise steps (or stepped portions). It may be that the sleeve transition region step (or stepped portion) comprises the (second) sealing surface of the sleeve. It may be that the inner bore transition region step comprises the (second) seal.

In this case, particularly when the second seal is resilient, the second seal also provides cushioning for the sleeve at the end of its closing stroke. This reduces the noise produced when the valve closes, and reduces the likelihood of damage to the sleeve or valve body. This also reduces the need for precise control over the movement of the sleeve, which reduces the complexity of the valve design and control mechanism.

Preferably the inner surface of the tubular wall of the valve body comprises the second seal, and the second sealing surface is an outer surface of (a tubular wall of) the sleeve.

The second seal may be provided in a recess in the inner surface of the tubular wall of the valve body. It may be that a sealing portion of the second seal extends into the inner bore (e.g. from the recess) to sealingly engage the second sealing surface of the sliding sleeve. The second seal is preferably biased towards, and in sealing engagement with, the sleeve as it moves between the open and closed positions.

The second seal may comprise a lip seal.

The second seal may be (inherently) resilient. The second seal may comprise a U-shaped profile (in cross-section parallel to the sliding axis). The U-shaped profile may be inherently resilient or a biasing means (e.g. a spring) may be provided in the U-shaped profile, the inherent resilience and/or biasing means (spring) biasing a portion of the U-shaped profile into sealing engagement with the (sealing surface of, such as an outer surface of a tubular wall of, the) sliding sleeve. Typically the U-shaped profile comprises two parallel (or substantially parallel) arms extending from a bridge extending between ends thereof. The biasing means and/or inherent resilience typically biases one of the two parallel (or substantially parallel) arms into sealing engagement with the second sealing surface (e.g. outer surface of a or the tubular wall) of the sliding sleeve. The other of the parallel (or substantially parallel) arms typically engages the (inside surface of the) tubular wall of the valve body.

The valve inlet is preferably axially between the first and second valve seals. Put another way, the first and second valve seals are typically provided on opposite axial sides of the valve inlet.

Accordingly, the sealing engagements between the first and second sealing surfaces and the first and second seals, together with the sleeve covering the valve inlet, typically prevent (or substantially prevent or at least restrict) water from passing through the inner bore to the valve outlet when the sleeve is in closed position.

It will be understood that by "axial" or "axially", we refer to a direction parallel to the sliding axis along which the sleeve slides between the open and closed positions.

Similarly, by "axial face" or "axial opening" we mean a face or opening perpendicular to the sliding axis.

The valve body typically comprises a first (axial) end and a second (axial) end opposite the first (axial) end. The first (axial) end of the valve body is typically closer to the first (axial) end of the inner bore than to the second (axial) end of the inner bore. Indeed the first (axial) end of the valve body may comprise the reverse side of an axial face defining the first end of the inner bore. The second (axial) end of the valve body is typically closer to the second (axial) end of the inner bore than to the first (axial) end of the inner bore.

Typically the sleeve slides along a sliding axis between the open and closed positions, and the inner bore has a cross sectional area perpendicular to the sliding axis which remains constant (or substantially constant) along the axial length of the valve body (at least between the valve inlet and the valve outlet, but preferably along the entire axial length of the tubular wall of the valve body).

The inner bore preferably has a width (perpendicular to the sliding axis), and preferably also a cross-sectional shape perpendicular to the sliding axis, which remains constant (or substantially constant) along its length (parallel to the sliding axis), at least between the valve inlet and valve outlet, but preferably along the entire axial length of the inner bore.

The tubular wall of the valve body typically has a cross sectional area (and typically a cross sectional shape) perpendicular to the sliding axis which remains constant (or substantially constant) along its length (parallel to the sliding axis).

Preferably, the sleeve has (a tubular wall having, or the tubular wall of the sleeve has) a width (perpendicular to the sliding axis), a cross sectional area perpendicular to the sliding axis and/or a cross sectional shape perpendicular to the sliding axis which remain constant (or substantially constant) along its length (parallel to the sliding axis).

The sleeve typically comprises a (first) sealing ridge comprising the (first) sealing surface. Typically the (first) sealing ridge comprises a first portion and a second portion, the second portion having a thickness (the shortest distance between inner and outer surfaces of the sleeve, typically parallel to the shortest distance between the inner and outer surfaces of the tubular wall of the valve body) which is greater than the thickness of the first portion, the first portion comprising the (first) sealing surface.

Typically the (first) sealing ridge has an outer surface which is flush with an outer surface of (a or the tubular wall of) the sleeve. It is preferable for an outer diameter of (the tubular wall of) the sleeve to be equal or substantially equal to an outer diameter of the (first) sealing ridge because this allows a lower energy biasing means (e.g. spring) to be provided to bias the sleeve towards the closed position (see below). If (at least a portion of, e.g. the tubular wall of) the sleeve had a different axial cross sectional area from the (e.g. to provide a step comprising the second seal as described above) first sealing ridge, this would lead to a pressure differential within the inner bore which would require a stronger biasing means to be provided to bias the sleeve towards (and hold the sleeve in) the closed position.

Preferably the (first) sealing ridge tapers down in thickness towards the (first) sealing surface. Typically the (first) sealing ridge (and, where provided, the second sealing ridge) comprises a tapered portion extending between the first and second portions, the tapered portion decreasing in thickness between the second and first portions. The sealing ridge thus provides a "knife edge" seal which tends to clear any obstructions to the sleeve moving to the closed position during valve closure and which will not inhibit the sleeve from sliding to the open position during valve opening.

In embodiments where the inner bore comprises a first axial inner bore region having a first width (perpendicular to the sliding axis) and a second axial inner bore region having a second width (perpendicular to the sliding axis, in the same dimension as the first width) greater than the first width, the second axial inner bore region being axially offset from the first axial inner bore region (parallel to the sliding axis), the sleeve may comprise a second sealing ridge comprising the second sealing surface. In this case, the second sealing ridge typically comprises a first portion and a second portion, the second portion having a thickness (the shortest distance between inner and outer surfaces of the sleeve, typically parallel to the shortest distance between the inner and outer surfaces of the tubular wall of the valve body) which is greater than the thickness of the first portion, the first portion comprising the second sealing surface.

Typically the sleeve is biased towards the closed position (by a (e.g. passive and/or active) biasing means). The biasing means may comprise a biasing member (e.g. a spring).

The sleeve is typically carried by a rod. The rod typically comprises a first end and a second end opposite the first end, the second end being connected (fixedly coupled) to the sleeve.

Typically the rod slides along the sliding axis with the sleeve when the sleeve moves between the open and closed positions.

The biasing means typically acts on the sleeve through the rod.

It may be that the snorkel valve further comprises an actively operated actuator configurable to move the sleeve from the closed position to the open position against a bias (e.g. a passive bias) of the biasing means when actuated. Typically the actuator acts on the sleeve through the rod.

Typically the actively operated actuator comprises a hydraulic actuator. Typically the hydraulic actuator comprises a hydraulic cylinder.

It will be understood that the hydraulic cylinder may but need not have a circular cross sectional area (perpendicular to the sliding axis). The hydraulic cylinder is preferably comprised in the valve body. The position of the hydraulic cylinder is typically fixed relative to the valve body.

At least a portion of the rod is typically slidable within the hydraulic cylinder.

The hydraulic cylinder typically comprises a first end and a second end opposite the first end. A portion of the rod comprising the second end of the rod typically protrudes out of an axial opening in the second end of the hydraulic cylinder. Indeed a portion of the rod typically protrudes out of an axial opening in the second end of the hydraulic cylinder (at all times) whether the sleeve is at the open position, the closed position or at a position intermediate the open and closed positions. The said portion of the rod is typically (fixedly) coupled to (e.g. an internal surface of the tubular wall of) the sleeve. The first end of the cylinder is typically axially offset from the second end of the cylinder along the sliding axis. The first end of the cylinder is typically closer to the first end of the rod than to the second end of the rod (whether the sleeve is in the open position, the closed position or at an intermediate position between the open and closed positions).

The portion of the rod slidable within the hydraulic cylinder typically comprises a hydraulic piston having a (first) driving surface (typically extending radially outwards from, and typically fixedly coupled to or integrally formed with) the rod towards (preferably to and in sealing engagement with) an inner surface of the hydraulic cylinder. The hydraulic actuator is typically configurable to move the sleeve from the closed position to the open position by providing pressurised hydraulic fluid to the (first) driving surface of the piston.

Typically the hydraulic actuator is configurable to provide pressurised fluid to the (first) driving surface of the piston via a first hydraulic fluid port in the cylinder. Preferably the first hydraulic fluid port comprises an opening in (e.g. a tubular wall or an axial end of) the hydraulic cylinder.

The portion of the rod comprising the hydraulic piston typically remains within the cylinder whether the sleeve is in the open position, the closed position or at an intermediate position between the open and closed positions.

The hydraulic piston typically comprises a second driving surface extending radially outwards from the rod towards (preferably to and in sealing engagement with) an inner surface of the hydraulic cylinder. The biasing means typically comprises a (passive) biasing member (such as a spring) referenced between the second driving surface and a stop provided within the cylinder.

The portion of the rod comprising the second driving surface typically remains within the cylinder whether the sleeve is in the open position, the closed position or at an intermediate position between the open and closed positions.

A (typically annular) stop may be provided which prevents the sleeve from sliding out of the inner bore when the sleeve is in the open position. The stop may be, but is not necessarily, part of the valve body. For example, the stop may be comprised in an additional component (e.g. an air induction tube provided in the deployable mast) on which the valve body is mounted in use. More preferably, the hydraulic cylinder comprises a stop which engages the rod when the sleeve is in the open position to prevent the rod from sliding out of the cylinder (typically in the direction in which the rod slides within the hydraulic cylinder when the sleeve slides from the closed position to the open position). It may be that the cylinder comprises a first portion having a first inner diameter and a second portion axially offset from the first portion, the second portion having a second inner diameter which is less than the first inner diameter. Typically the first portion of the cylinder is closer to the first end of the cylinder than the second portion of the cylinder is to the first end of the cylinder. Typically the second portion of the cylinder is closer to the second end of the cylinder than the first portion is to the second end of the cylinder. It may be that the stop comprises a transition region between the first portion and the second portion. The transition region may comprise a tapered region, but more typically the transition region comprises a step. In this case, the rod typically comprises a first portion having a first outer diameter which reciprocates in the first portion of the cylinder and a second portion axially offset from the first portion of the rod, the second portion of the rod having a second outer diameter at least part of which is reciprocable in the second portion of the cylinder, the second outer diameter being less than the first outer diameter. The rod preferably comprises a transition region between the first portion and the second portion. The transition region of the rod typically engages the transition region of the hydraulic cylinder (i.e. the stop of the hydraulic cylinder) when the sleeve is in the open position. The transition region of the rod may comprise a tapered region, but more typically the transition region of the rod comprises a step between the first and second portions of the rod. Typically the transition regions of the cylinder and the rod are configured to prevent the transition region of the rod from sliding past the transition region of the cylinder (in the opening direction). Typically the transition regions of the cylinder and rod are co-operable (e.g. the transition region of the cylinder comprises a step and the transition region of the rod comprises a step which engages the transition region of the cylinder when the sleeve is in the open position).

Preferably, the stop is resilient. For example, it may be that the stop comprises a resilient member, such as a resilient (e.g. elastomeric) ring. By making the stop resilient, it cushions the rod/sleeve when it reaches the open position, thereby reducing the noise produced when the valve is opened and reducing the likelihood of damage to the rod/sleeve and valve body. This also reduces the need for precise control over the movement of the sleeve, which reduces the complexity of the valve design and control mechanism.

The biasing member may comprise a biasing spring provided in the cylinder, the biasing spring having a first end referenced against the second driving surface and having a second end opposite the first end referenced against a (annular) stop provided in the cylinder. The biasing spring may be coupled (e.g. fastened) to the rod.

The stop in the cylinder against which the biasing means (spring) is referenced may be an (annular) inner axial end face (provided at the second end) of the cylinder.

Typically the sleeve is (selectively) actively biased towards the closed position.

Typically the sleeve is both passively and (selectively) actively biased towards the closed position. The passive bias is typically provided by a or the biasing spring.

It may be that the sleeve is (selectively) actively biased towards the closed position by the actively operated actuator.

The sleeve is typically (selectively) actively biased towards the closed position through the rod.

Typically the sleeve is (selectively) actively biased towards the closed position by the hydraulic actuator, the hydraulic actuator being configurable to provide pressurised hydraulic fluid to the second driving surface, to thereby drive the rod, and therefore the sleeve, towards the closed position.

Typically the hydraulic actuator provides pressurised hydraulic fluid to the second driving surface of the hydraulic piston through a second hydraulic fluid port in the cylinder. The second hydraulic fluid port is typically provided in a tubular wall of the cylinder, typically adjacent the first end of the cylinder. It may be that pressurised fluid is provided to the second driving surface of the piston from the second hydraulic fluid inlet port via a fluid channel extending axially through the tubular wall of the hydraulic cylinder.

The said second driving surface is typically provided (vertically) adjacent to (but typically axially offset from) the first driving surface. The second driving surface is typically provided closer to the second axial end of the rod than the first driving surface is to the second axial end of the rod. The first driving surface is typically provided closer to the first axial end of the rod than the second driving surface is to the first axial end of the rod.

The hydraulic actuator may be configurable to provide pressurised fluid to the (first) driving surface of the piston via the first hydraulic fluid port in the cylinder to drive the piston (and thus the sleeve) towards the open position against the bias of the (passive) biasing means.

Typically the sleeve is not actively biased towards the closed position when the sleeve is being actively moved to the open position.

Preferably, the valve is configurable such that, when the sleeve is being actively moved to the open position, hydraulic fluid in communication with the second driving surface of the piston is at a lower pressure than the hydraulic fluid driving the first driving surface. It may be that any hydraulic fluid in (direct) communication with the first driving surface is not pressurised when the sleeve is being moved to the open position. It may be that, when the sleeve is being moved to the open position, fluid in communication with the second driving surface is driven out of the cylinder through the second hydraulic fluid port to a return line (which may for example lead to a hydraulic fluid reservoir which may be in communication with a pressurising means such as a pump).

The biasing means may comprise active biasing means and passive biasing means. Preferably, the valve is configured such that the force exerted by the passive biasing means biasing the sleeve to the closed position is sufficient to close the valve. Nevertheless, it may be that an active biasing means is provided in order to increase the speed with which the sleeve can be moved from the open position to the closed position. As indicated above, the active biasing means may comprise pressurised hydraulic fluid driving the second driving surface of the rod towards the closed position. When the sleeve is moved to the closed position, the pressurised fluid driving the second driving surface is at a greater pressure than hydraulic fluid in communication with the driving surface of the first driving surface. It may be that any fluid in (direct) communication with the first driving surface is not pressurised when the sleeve is moved to the closed position. It may be that, when the sleeve is moved to the closed position, fluid in communication with the first driving surface is driven out of the cylinder through the first hydraulic fluid port to a return line (which may for example lead to a hydraulic fluid reservoir which may be in fluid communication with a pressurising means such as a pump).

The first and second driving surfaces typically remain within the cylinder whether the sleeve is in the open position, the closed position or between the open and closed positions.

One or more oil seals are typically provided between the rod and the hydraulic cylinder (or the valve body) to inhibit the flow of hydraulic fluid out of the cylinder and into the valve body. One or more water seals may be provided between the rod and the hydraulic cylinder (or the valve body) to inhibit the flow of water into the cylinder from the valve body. The water seal(s) may be axially offset from the oil seal(s). The oil seal(s) may be axially closer to the first end of the rod than the water seals are to the first end of the rod, and the water seals may be axially closer to the second end of the rod than the oil seals are to the second end of the rod.

A water outlet port may be provided in fluid communication with the cylinder through which any water entering the cylinder from the valve body may be extracted from the cylinder. The water outlet port may be provided in a tubular wall of the cylinder. The water outlet port is typically axially offset from the second end of the cylinder, towards the first end of the cylinder. A water outlet conduit may be provided (e.g. within the tubular wall of the cylinder) in fluid communication with the water outlet port, which delivers the extracted water to a dirty water drain. The water outlet port is typically provided axially between the oil seal(s) and the water seal(s).

The first end of the cylinder typically also comprises a water drain connector in fluid communication with the water drain channel.

It may be that the sleeve comprises or consists of a composite material. The said composite material may comprise or consist of, for example, glass reinforced plastic (GRP) or, more preferably, carbon fibre reinforced plastic (CFRP).

For example, the sleeve may comprise a tubular wall comprising a composite material. In one embodiment, the sleeve comprises a tubular wall comprising or consisting of carbon fibre reinforced plastic.

Preferably the sleeve comprises a (first) sleeve protector at a first end of (a or the tubular wall of) the sleeve. A second sleeve protector may be provided at a second end of (a or the tubular wall of) the sleeve. The sleeve protector(s) may (each) comprise, a ring which may in some embodiments be metallic or elastomeric provided over the first (and, in the case of a second sleeve protector, the second) outer axial end(s) of the (tubular wall of the) sleeve. The carbon fibre reinforced plastic (CFRP) tubular wall provides the sleeve with low weight, while the sleeve protector(s) protect the CFRP tubular wall when the sleeve moves to the closed, and in some embodiments the open, positions (the (first) sleeve protector absorbing the impact when the first axial end of the sleeve engages the (first) seal during valve closure and in some embodiments the second sleeve protector absorbing an impact when the second axial end of the sleeve engages a stop during valve opening).

The first sleeve protector may comprise the (first) sealing surface (e.g. the (first) sealing ridge).

The (first) sealing ridge is typically provided on the first sleeve protector.

Preferably the valve body (or the hydraulic cylinder) comprises heater terminals for electrically coupling one or more heaters to an electrical power source (preferably for electrically coupling two or more heaters to an electrical power source, or two or more respective electrical power sources).

A heater may be provided on the valve body. For example, a heating element may be wrapped around the valve body. The heater may be electrically coupled to the heater terminals of the said heater terminals.

It may be that the heater terminals and the hydraulic cylinder connections are provided in a cavity adjacent to the first end of the hydraulic cylinder.

It may be that the snorkel valve comprises one or more heaters configured to heat (e.g. the tubular wall of) the valve body (typically to thereby inhibit ice from forming in or on the valve body, or between the valve body and the sleeve or on the sleeve, to thereby help prevent jamming of the said sleeve slidable within the inner bore).

It may be that the said one or more heaters comprises a plurality of said heaters.

It may be that the said one or more heaters comprises a plurality of heaters arranged around the perimeter of (e.g. the tubular wall of) the valve body. Typically the said heaters of the plurality of heaters are distributed around the perimeter of (e.g. the tubular wall of) the valve body. Typically the said heaters of the plurality of heaters are spaced from each other around the perimeter of (e.g. the tubular wall of) the valve body. Typically the said heaters of the plurality of heaters are regularly (e.g. periodically) spaced from each other around the perimeter of (e.g. the tubular wall of) the valve body. It may be that the spacings between each adjacent pair of heaters around the perimeter of the valve body are (at least substantially) equal.

Preferably the heat output by one or more or each of the said heaters is regulated (e.g. to prevent overheating of the valve body and/or the heaters themselves).

It may be that one or more thermostats are provided, each of which is configured to control the heat output by a respective heater of the said one or more heaters responsive to a measured temperature (e.g. responsive to a measured ambient temperature, a measured temperature of the valve body or a measured temperature of a heating element of the heater). For example, it may be that one or more or each of the said one or more heaters comprises a (e.g. integral) thermostat configured to control the heat output by the said heater responsive to the said measured temperature.

Preferably, each of the said heaters is configured to have a predetermined maximum temperature (e.g. 100° C.).

It may be that each of the said heaters is configured to turn off (or each of the said heaters is configured such that an electrical current flowing through one or more heating elements of the heater is reduced) responsive to a temperature (e.g. a measured temperature or the temperature of a heating element of the heater) reaching (or approaching or exceeding) the predetermined maximum temperature. For example, it may be that a (typically integral) thermostat associated with each heater is configured to change the state of (e.g. open or close) a switch responsive to a determination that a measured temperature (e.g. a measured ambient temperature, a measured temperature of the valve body or a measured temperature of a heating element of the heater) has reached (or approaches or exceeds) the predetermined maximum temperature to thereby turn off (or reduce the electrical current flowing through one or more heating elements of) the heater. It may be that each said heater is configured to turn on (or each of the said heaters is configured such that the electrical current flowing through one or more heating elements of the heater is increased) responsive to the temperature falling below the predetermined maximum temperature (e.g. by a threshold amount). For example, it may be that a (typically integral) thermostat associated with each heater is configured to change the state of (e.g. close or open) a or the switch responsive to a determination that the measured temperature has fallen below the predetermined maximum temperature (e.g. by a threshold amount) to thereby turn on (or increase the electrical current flowing through one or more heating elements of) the heater. It may be that one or more or each of the heaters comprises one or more (typically electrically powered) heating elements. It may be that one or more or each of the heaters comprises one or more electrically powered heating elements having positive thermal coefficients of resistance (PTC), i.e. heating elements having electrical resistances which increase upon heating. Typically the said PTC heating elements self-regulate their temperatures by virtue of the fact that their electrical resistances increase upon heating. Typically each of the said PTC heating elements are provided with threshold temperatures above which the electrical current flowing through the heating element for a given voltage across it is reduced by, for example at least 25%, more preferably at least 50%, more preferably at least 70%, for example at least 90%, when its temperature exceeds the said threshold temperature as compared to the electrical current flowing through the heating element when that voltage is applied across it at a reference temperature (e.g. the reference temperature may be for example 25° C.).

It may be that one or more or each of the said one or more heaters are provided between the inner and outer surfaces of the tubular wall of the valve body. It may be that one or more or each of the said one or more heaters is embedded within the valve body. It may be that one or more or each of the said one or more heaters is embedded between the inner and outer surfaces of the tubular wall of the valve body. For example, the (tubular wall of the) valve body may comprise a plurality of axial bores (typically distributed (typically regularly spaced) around the perimeter of the tubular wall of the valve body) in which the heaters are provided. Typically the axial bores are provided between the inner and outer surfaces of the tubular wall of the valve body. It may be that the axial bores are formed by drilling into the tubular wall of the valve body in an axial direction (e.g. from an axial face of, or adjacent to (e.g. set back from), a or the second axial end of the said tubular wall towards a or the first axial end of the said tubular wall opposite the second axial end). It may be that the said axial bores extend from the axial face of, or adjacent to (e.g. set back from), the second axial end of the tubular wall of the valve body towards the first axial end of the tubular wall of the valve body. It may be that the said axial bores each have an opening extending through the axial face of, or adjacent to, the second axial end of the tubular wall of the valve body such that the heaters can be inserted therein during assembly. It may be that the said axial bores have closed ends opposite the openings. It may be that the closed ends of one or more of the axial bores are provided adjacent to the first axial end of the tubular wall of the valve body, or at least closer to the first axial end of the tubular wall of the valve body than to the second axial end of the tubular wall of the valve body.

Typically the heaters are elongate. Typically the heaters are cylindrical. It may be that the heaters are (e.g. elongate, preferably cylindrical) cartridge heaters.

This arrangement helps to distribute heat from the heaters evenly throughout the tubular wall of the valve body, thereby helping to prevent ice from forming on the tubular wall of the valve body, thereby helping the valve to operate without jamming even at low ambient temperatures.

Typically the heaters are electrically connected to an electrical power source (which is typically provided in a sail or pressure hull of a submarine to which the deployable submarine mast is coupled). Typically the heaters are electrically connected to the electrical power source in parallel (e.g. by way of a terminal block provided in the deployable submarine mast). Typically the heaters are electrically connected in parallel with each other.

Preferably, the valve is provided with a manual override to hold the sleeve in either the open or closed position as required in the event of a (e.g. hydraulic or electrical) actuation failure. The manual override is typically provided by a hydraulic control valve provided in (e.g. a pressure hull of) the submarine.

A second aspect of the invention provides a deployable submarine mast assembly comprising: an air induction tube and a snorkel valve according to the first aspect of the invention mounted on (or mountable to) an end of the said air induction tube, the outlet of the snorkel valve being in fluid (air) communication with the said air induction tube.

The snorkel valve typically controls a flow of fluid into the air induction tube.

Typically, when the sleeve of the snorkel valve is in the open position, air can enter the air induction tube through the snorkel valve. Typically when the sleeve of the snorkel valve is in the closed position, water cannot enter the air induction tube through the snorkel valve.

Preferably, the snorkel valve is mounted on a first end of the said air induction tube.

It may be that the first end of the air induction tube has an inner diameter (or inner width perpendicular to the sliding axis) which is less than an inner diameter (or inner width perpendicular to the sliding axis) of the valve outlet. Preferably the valve outlet comprises an axial opening in the tubular wall of the valve body. Typically the air induction tube has a tubular wall. In some embodiments the tubular wall of the air induction tube (has a thickness which) overlaps a portion of the valve outlet. In this case the said overlapping portion of (the thickness of) the tubular wall of the air induction tube may form an annular stop which prevents the sleeve from exiting the inner bore of the valve body through the outlet when the sleeve is in the open position. However as set out above in respect of the first aspect of the invention, the stop is more preferably provided in a hydraulic cylinder of a hydraulic actuator which controls the opening and closing of the valve. Preferably, the stop is resilient. For example, the stop may comprise a resilient member, such as a resilient (e.g. elastomeric) ring.

The snorkel valve and at least a portion of (or a majority of or all of) the air induction tube are typically housed in a protective fairing. Typically the protective fairing is profiled.

Preferably the protective fairing is preferably shaped hydrodynamically.

It may be that the protective fairing has a cross-section parallel to the principle axis along which a submarine comprising the deployable mast assembly travels in use, the cross-section having a shape comprising rounded leading edge, a straight trailing edge extending perpendicularly to the principle axis, and a rounded middle portion extending between the rounded leading edge and the straight trailing edge, the middle portion having a greater extent perpendicular to the principle axis than the leading edge and the trailing edge.

Preferably the fairing comprises an air inlet port. Preferably the air inlet port is provided on a downstream side of the fairing.

Typically the air inlet port receives air into the fairing when the said air inlet port protrudes above the water surface.

Preferably, the air inlet port is provided at or (more typically) adjacent to a first (distal) end of the fairing, the first end of the fairing being adjacent to the snorkel valve. The first end of the fairing is the end of the fairing which is exposed to the air first when the deployable mast assembly is deployed when a submarine comprising the deployable mast assembly is at snorkel depth.

Preferably the air inlet port is provided in a tubular wall of the fairing. Preferably the air inlet port of the fairing is adjacent to the valve inlet.

Preferably, a protective grill is provided over or under the air inlet port in the fairing to prevent objects from entering the fairing through the air inlet port.

Preferably, the fairing is (completely) closed (but not typically sealed) with the exception of the air inlet port.

Typically the air induction tube comprises a fixed portion and one or more telescopically extendable and telescopically retractable portions. Typically the snorkel valve is mounted to an extendable and retractable portion.

Typically the deployable mast assembly further comprises one or more sensors in communication with a controller, the controller being configured to move the sleeve to, or hold the sleeve in, the open or closed positions responsive to signals received from the sensors.

The said one or more sensors typically comprise one or more water sensors and/or one or more pressure sensors.

The said one or more sensors are typically provided in fluid communication with the air inlet port of the fairing.

The said one or more sensors may be provided in or on the fairing or on the (outer surface of the) valve body. The said one or more sensors may be provided within the (e.g. on an inner surface of a tubular wall of the) fairing. The said one or more sensors may be provided between the fairing and the valve body. Typically one or more of the said one or more sensors are provided adjacent to (in some cases axially offset below), or in, the air inlet port.

The said one or more sensors are typically provided in electronic communication with the controller. The said one or more sensors are preferably configured to provide an indication to the controller as to whether at least a portion of (or the majority of or all of) the air inlet port of the fairing is submerged below the water surface.

Preferably the said one or more sensors comprise one or more pressure sensors. It may be that the pressure sensors (where provided) are configured to provide an indication of the depth of the pressure sensors below the water surface.

Typically the deployable mast assembly comprises a plurality of sensors in communication with the controller, the controller being configured to move the sleeve to, or hold the sleeve in, the open or closed positions responsive to signals received from a plurality (e.g. each) of the sensors.

Preferably the said plurality of sensors comprises at least two sensors of different types. For example, it may be that at least one water sensor and at least one pressure sensor are provided.

In some embodiments, the deployable mast assembly comprises a plurality of sensors, or a plurality of pairs of sensors, physically spaced from each other and in communication with the controller, the controller being configured to take into account signals from the said plurality of sensors, or the said plurality of pairs of sensors, to determine whether to move the sleeve to, or hold the sleeve in, the open position or whether to move the sleeve to, or hold the sleeve in, the closed position.

Preferably the said plurality of sensors comprises at least a first sensor (or a first pair of sensors) upstream of a second sensor (or a second pair of sensors). The said first sensor (or first pair of sensors) is (are) typically provided closer to the upstream surface of the fairing than to the downstream surface of the fairing and the second sensor (or second pair of sensors) is provided closer to the downstream surface of the fairing than to the upstream surface of the fairing. The said second sensor (or second pair of sensors) is typically provided adjacent to the air inlet port of the fairing.

Typically the deployable mast assembly further comprises at least one pair of sensors, each of the said at least one pair of sensors comprising a first sensor of a first type adjacent to a second sensor of a second type different from the first type.

By providing different types of sensors adjacent to each other, signals from the sensors can be compared to provide a more reliable indication of whether the at least a portion of (or a majority of or all of) the air inlet port of the fairing is submerged below the water surface (and therefore whether the valve should be closed, if operating in snorkelling mode). Accordingly, the controller is typically configured to compare signals from the two sensors within a pair to determine whether that pair of sensors is submerged. It may be that the controller is configured to move the sleeve to (or hold the sleeve in) the open or closed positions responsive to a determination that the readings from the first and second sensors within one or more pairs of sensors are consistent.

Preferably, the said plurality of sensors comprises at least one pair of sensors comprising a water sensor adjacent to a pressure sensor.

Preferably a plurality of pairs of sensors are provided. Preferably pairs of sensors of the said plurality of pairs of sensors are spaced from each other.

Preferably two or more pairs of sensors are provided. Preferably the said two or more pairs comprise a first, forward pair provided upstream of a second, aft pair. In some embodiments, a first, forward pair may be provided upstream of a second, aft pair and a third, aft pair.

Preferably the deployable mast assembly comprises at least three pairs of sensors, each pair comprising a first sensor of a first type and a second sensor of a second type different from the first type, the said at least three pairs of sensors comprising a first pair of sensors housed in or on an upstream side (i.e. closer to the upstream surface than the downstream surface) of the fairing and second and third pairs of sensors housed in or on a downstream side (i.e. closer to the downstream surface than the upstream surface) of the fairing in fluid communication with the air inlet port.

The at least three pairs of sensors are typically provided adjacent to the said distal end of the fairing.

By the upstream side of the fairing, we refer to the front of the fairing with respect to the forward direction of travel of a submarine comprising the deployable mast assembly. By the downstream side of the fairing, we refer to the rear of the fairing with respect to the forward direction of travel of a submarine comprising the deployable mast assembly.

The controller typically has a plurality of (typically alternative) modes including a snorkelling mode and a dive mode.

Typically, in the snorkelling mode, the controller is configured to move the sleeve to the closed position, or to hold the sleeve in the closed position, responsive to an indication from the sensors that the air inlet port in the fairing is submerged below the water surface.

Typically, in the snorkelling mode, the controller is configured to move the sleeve to the open position, or to hold the sleeve in the open position, responsive to an indication from the sensors that the air inlet port in the fairing is above the water surface.

The controller may have a dive mode. The controller is typically configured to enter the dive mode (e.g. from the snorkelling mode) responsive to a determination that the depth of a submarine comprising the deployable mast assembly below the water surface exceeds a threshold depth below the water surface.

In the dive mode, the controller is typically configured to move the sleeve from the closed position to the open position to thereby flood the air induction tube with water so as to equalise the pressures on inner and outer surfaces of the tube (to prevent damage to the air induction tube). The controller is configured to move the sleeve to the closed position in the dive mode when the air induction tube has been flooded (e.g. responsive to a determination that the pressure on the inner surface of the air induction tube equals (or substantially equals) the pressure on the outer surface of the air induction tube, or when the sleeve has been in the open position for a predetermined time period in dive mode).

The controller may be configured to enter snorkelling mode (e.g. from the dive mode) responsive to a determination that the depth of a submarine comprising the deployable mast assembly below the water surface is less than a or the said threshold depth. When the controller switches from the dive mode to the snorkelling mode, the controller is typically configured to drain the air induction tube of water before the sleeve can be moved from the closed position to the open position (typically responsive to a determination that the air inlet port in the fairing is above the water surface).

The controller may be configured to switch between modes responsive to signals received from the sensors. For example the controller may be configured to switch from snorkelling mode to a or the dive mode responsive to signals received from one or more (e.g. pressure) sensors indicating that the said one or more (e.g. pressure) sensors are at a depth below the water surface which exceeds a threshold depth. The controller may be configured to switch from the dive mode to the snorkelling mode responsive to signals received from one or more (e.g. pressure) sensors indicating that the said one or more (e.g. pressure) sensors are at a depth below the water surface which is less than a or the threshold depth.

It will be understood that, by "signals received from" sensors, we also include signals derived from signals received from the sensors.

Typically a hydraulic system is provided which is configured to control the opening and closing of the snorkel valve. The hydraulic system preferably comprises a (or the) controller and a pressurised hydraulic fluid source in fluid communication with the hydraulic cylinder via changeover valve circuitry. Typically the controller has a first, opening mode in which it configures the changeover valve circuitry (which may comprise a single changeover valve or a plurality of valves) to connect the pressurised hydraulic fluid source to the first driving surface of the piston, to thereby drive the sleeve to the open position. In the first, opening mode, the second driving surface of the piston is disconnected from the pressurised fluid source. The second driving surface of the piston may be fluidly connected to a return line which is in fluid communication with a hydraulic fluid tank. The hydraulic fluid tank may be configured to supply the pressurised fluid source with unpressurised fluid.

The controller typically has a second, closing mode in which it configures the changeover valve circuitry to connect the pressurised hydraulic fluid source to the second driving surface of the piston, to thereby drive the sleeve to the closed position. The first driving surface of the piston is typically disconnected from the pressurised fluid source. The first driving surface of the piston may be fluidly connected to a or the return line which is in fluid communication with a or the hydraulic fluid tank.

Typically, one or more heaters (e.g. heating elements) are provided. A first heater may be provided adjacent to the air inlet port of the fairing. The first heater is typically configured to heat incoming air, thereby helping to prevent ice from forming. A second heater may be provided on the valve body, thereby helping to prevent ice from forming in the valve body which could otherwise cause jamming of the sliding sleeve. It may be that the second heater is wrapped around the valve body. For example, the second heater may be a heating element wrapped around the valve body.

It may be that the snorkel valve comprises one or more heaters configured to heat (e.g. the tubular wall of) the valve body (typically to thereby inhibit ice from forming in or on the valve body, or between the valve body and the sleeve or on the sleeve, to thereby help prevent jamming of the said sleeve slidable within the inner bore).

It may be that the said one or more heaters comprises a plurality of said heaters.

It may be that the said one or more heaters comprises a plurality of heaters arranged around the perimeter of (e.g. the tubular wall of) the valve body. Typically the said heaters of the plurality of heaters are distributed around the perimeter of (e.g. the tubular wall of) the valve body. Typically the said heaters of the plurality of heaters are spaced from each other around the perimeter of (e.g. the tubular wall of) the valve body. Typically the said heaters of the plurality of heaters are regularly (e.g. periodically) spaced from each other around the perimeter of (e.g. the tubular wall of) the valve body. It may be that the spacings between each adjacent pair of heaters around the perimeter of the valve body are (at least substantially) equal.

Preferably the heat output by one or more or each of the said heaters is regulated (e.g. to prevent overheating of the valve body and/or the heaters themselves).

It may be that one or more thermostats are provided, each of which is configured to control the heat output by a respective heater of the said one or more heaters responsive to a measured temperature (e.g. responsive to a measured ambient temperature, a measured temperature of the valve body or a measured temperature of a heating element of the heater). For example, it may be that one or more or each of the said one or more heaters comprises a (e.g. integral) thermostat configured to control the heat output by the said heater responsive to the said measured temperature.

Preferably, each of the said heaters is configured to have a predetermined maximum temperature (e.g. 100° C.).

It may be that each of the said heaters is configured to turn off (or each of the said heaters is configured such that an electrical current flowing through one or more heating elements of the heater is reduced) responsive to a temperature (e.g. a measured temperature or the temperature of a heating element of the heater) reaching (or approaching or exceeding) the predetermined maximum temperature. For example, it may be that a (typically integral) thermostat associated with each heater is configured to change the state of (e.g. open or close) a switch responsive to a determination that a measured temperature (e.g. a measured ambient temperature, a measured temperature of the valve body or a measured temperature of a heating element of the heater) has reached (or approaches or exceeds) the predetermined maximum temperature to thereby turn off (or reduce the electrical current flowing through one or more heating elements of) the heater. It may be that each said heater is configured to turn on (or each of the said heaters is configured such that the electrical current flowing through one or more heating elements of the heater is increased) responsive to the temperature falling below the predetermined maximum temperature (e.g. by a threshold amount). For example, it may be that a (typically integral) thermostat associated with each heater is configured to change the state of (e.g. close or open) a or the switch responsive to a determination that the measured temperature has fallen below the predetermined maximum temperature (e.g. by a threshold amount) to thereby turn on (or increase the electrical current flowing through one or more heating elements of) the heater. It may be that one or more or each of the heaters comprises one or more (typically electrically powered) heating elements. It may be that one or more or each of the heaters comprises one or more electrically powered heating elements having positive thermal coefficients of resistance (PTC), i.e. heating elements having electrical resistances which increase upon heating. Typically the said PTC heating elements self-regulate their temperatures by virtue of the fact that their electrical resistances increase upon heating. Typically each of the said PTC heating elements are provided with threshold temperatures above which the electrical current flowing through the heating element for a given voltage across it is reduced by, for example at least 25%, more preferably at least 50%, more preferably at least 70%, for example at least 90%, when its temperature exceeds the said threshold temperature as compared to the electrical current flowing through the heating element when that voltage is applied across it at a reference temperature (e.g. the reference temperature may be for example 25° C.).

It may be that one or more or each of the said one or more heaters are provided between the inner and outer surfaces of the tubular wall of the valve body. It may be that one or more or each of the said one or more heaters is embedded within the valve body. It may be that one or more or each of the said one or more heaters is embedded between the inner and outer surfaces of the tubular wall of the valve body. For example, the (tubular wall of the) valve body may comprise a plurality of axial bores (typically distributed (typically regularly spaced) around the perimeter of the tubular wall of the valve body) in which the heaters are provided. Typically the axial bores are provided between the inner and outer surfaces of the tubular wall of the valve body. It may be that the axial bores are formed by drilling into the tubular wall of the valve body in an axial direction (e.g. from an axial face of, or adjacent to (e.g. set back from), a or the second axial end of the said tubular wall towards a or the first axial end of the said tubular wall opposite the second axial end). It may be that the said axial bores extend from the axial face of, or adjacent to (e.g. set back from), the second axial end of the tubular wall of the valve body towards the first axial end of the tubular wall of the valve body. It may be that the said axial bores each have an opening extending through the axial face of, or adjacent to, the second axial end of the tubular wall of the valve body such that the heaters can be inserted therein during assembly. It may be that the said axial bores have closed ends opposite the openings. It may be that the closed ends of one or more of the axial bores are provided adjacent to the first axial end of the tubular wall of the valve body, or at least closer to the first axial end of the tubular wall of the valve body than to the second axial end of the tubular wall of the valve body.

Typically the heaters are elongate. Typically the heaters are cylindrical. It may be that the heaters are (e.g. elongate, preferably cylindrical) cartridge heaters.

This arrangement helps to distribute heat from the heaters evenly throughout the tubular wall of the valve body, thereby helping to prevent ice from forming on the tubular wall of the valve body, thereby helping the valve to operate without jamming even at low ambient temperatures.

Typically the heaters are electrically connected to an electrical power source (which is typically provided in a sail or pressure hull of a submarine to which the deployable submarine mast is coupled). Typically the heaters are electrically connected to the electrical power source in parallel (e.g. by way of a terminal block provided in the deployable submarine mast). Typically the heaters are electrically connected in parallel with each other.

Preferably, the biasing force exerted by the biasing means biasing the sleeve to the closed position is sufficient to move the sleeve to the closed position if there is an (e.g. hydraulic or electrical) actuation failure.

A third aspect of the invention provides a submarine comprising the snorkel valve according to the first aspect of the invention.

A fourth aspect of the invention provides a submarine comprising the deployable mast assembly according to the second aspect of the invention.

A fifth aspect of the invention provides a method of operating an active snorkel valve comprised in a deployable mast assembly having an air inlet port, the active snorkel valve comprising:
- a valve body having: a tubular wall having an outer surface and an inner surface on the reverse side of the outer surface, the inner surface defining an inner bore; a valve inlet extending through the tubular wall to fluidly connect the outer surface and the inner bore; and a valve outlet (different from the valve inlet) in fluid communication with the inner bore, and
- a sleeve slidable within the said inner bore between a closed position in which it (typically fully) covers the said valve inlet to thereby inhibit (e.g. prevent or at least restrict) water from flowing from the air inlet port into the inner bore through the valve inlet, and an open position in which at least a portion (preferably all) of the said valve inlet is uncovered by the sleeve to thereby allow air to flow from the air inlet port into the said inner bore through the said valve inlet (and out of the inner bore through the said valve outlet), the method comprising: moving the sleeve to, or holding the sleeve in, the closed position responsive to a determination that at least a portion of (or a majority of or all of) the air inlet port is submerged below a water surface; and moving the sleeve to, or holding the sleeve in, the open position responsive to a determination that the air inlet port is above the said water surface.

It will be understood that when the sleeve is in the open position, the valve inlet is in fluid (air) communication with the air inlet port.

The air inlet port is typically provided on a fairing housing the snorkel valve. Typically the air inlet port is provided adjacent to a distal end of the fairing. Typically the air inlet port is provided on a downstream surface of the fairing.

The method may further comprise the sleeve covering the valve inlet when it is in the closed position.

The method may further comprise sealingly engaging a first sealing surface of the sleeve with a first valve seal provided in the valve body when the sleeve is in the closed position.

The method may comprise clearing one or more obstructions between the sleeve and the first valve seal by the said (first) sealing ridge as the sleeve is moved from the open position to the closed position.

The method may further comprise sealingly engaging a second sealing surface of the sleeve with a second valve seal provided in the valve body when the sleeve is in the closed position.

It may be that the first and second valve seals are provided on opposing axial sides of the valve inlet. That is, the valve inlet is typically provided axially between the first and second valve seals.

The method may further comprise moving the sleeve to the closed position and cushioning (e.g. the first axial end of) the sleeve when it reaches the closed position.

The method may further comprise moving the sleeve to the open position and cushioning (e.g. a rod carrying the sleeve or the second axial end of) the sleeve when it reaches the (or a fully) open position.

The method may further comprise determining whether the air inlet port is submerged below a water surface taking into account signals from at least one sensor (preferably a plurality of sensors or a plurality of pairs of sensors).

The sensors may be provided and arranged as explained in respect of the first aspect of the invention.

The method may further comprise determining whether the air inlet port is submerged below a or the water surface taking into account signals from a first sensor of a first type and a second sensor of a second type different from the first type.

The method preferably comprises determining whether the air inlet port is submerged below the surface by taking into account signals from at least three pairs of sensors, each of the said pairs of sensors comprising a first sensor of the first type and a second sensor of the second type. Preferably, within each pair, the first sensor is a water sensor and the second sensor is a pressure sensor. Preferably within each pair the first and second sensors are adjacent to each other.

The method may further comprise determining a depth of a submarine comprising the deployable mast assembly from signals received from the said one or more sensors, and selecting an operating mode responsive to the determined depth. The method may comprise selecting a snorkelling mode responsive to a determination that the submarine is above a threshold depth below a water surface. The method may comprise selecting a dive mode responsive to a determination that the submarine is below a or the threshold depth below the water surface.

The method may comprise, in the snorkelling mode, moving the sleeve to, or holding the sleeve in, the closed position responsive to a determination that the air inlet port is submerged below a water surface; and moving the sleeve to, or holding the sleeve in, the open position responsive to a determination that the air inlet port is above the said water surface.

The method may comprise, in the dive mode, moving the sleeve from the closed position to the open position, to thereby allow water to enter the valve (and thus a or the air induction tube on which the valve is mounted, so as to equalise the pressure on outer and inner surfaces of the air induction tube to prevent damage thereto). The method may further comprise, in the dive mode, moving the sleeve to the closed position from the open position (typically when the air induction tube has been flooded, e.g. responsive to a determination that the pressure on the inner surface of the air induction tube equals (or substantially equals) the pressure on the outer surface of the air induction tube, or when the sleeve has been in the open position for a predetermined time period in dive mode).

The method may comprise heating (e.g. the tubular wall of) the valve body (typically to thereby inhibit ice from forming in or on the valve body, or between the valve body and the sleeve or on the sleeve, to thereby help prevent jamming of the said sleeve slidable within the inner bore).

The method may comprise applying heat to (e.g. the tubular wall of) the valve body around the perimeter of (e.g. the tubular wall of) the valve body. The method may comprise applying heat to (e.g. the tubular wall of) the valve body at a plurality of positions distributed (e.g. spaced or regularly spaced) around the perimeter of (e.g. the tubular wall of) the valve body. The method may further comprise regulating the heat output by one or more or each of the said heaters (e.g.

responsive to (e.g. a measured) temperature), for example to prevent overheating of the valve body and/or the heaters themselves. It may be that one or more thermostats are provided, each of which is configured to control the heat output by a respective heater of the said one or more heaters responsive to a measured temperature (e.g. responsive to a measured ambient temperature, a measured temperature of the valve body or a measured temperature of a heating element of the heater). For example, it may be that one or more or each of the said one or more heaters comprises a (e.g. integral) thermostat configured to control the heat output by the said heater responsive to the said measured temperature.

Preferably, each of the said heaters is configured to have a predetermined maximum temperature (e.g. 100° C.).

The method may further comprise turning off (or reducing an electrical current flowing through one or more heating elements of) a said heater responsive to a temperature (e.g. a measured temperature or the temperature of a heating element of the heater) reaching (or approaching or exceeding) the predetermined maximum temperature.

For example, it may be that a (typically integral) thermostat associated with each said heater is configured to change a state of (e.g. open or close) a switch responsive to a determination that a measured temperature (e.g. a measured ambient temperature, a measured temperature of the valve body or a measured temperature of a heating element of the heater) has reached (or approaches or exceeds) the predetermined maximum temperature to thereby turn off (or reduce the electrical current flowing through one or more heating elements of) the heater. The method may further comprise turning on (or increasing an electrical current flowing through one or more heating elements of) the heater responsive to the temperature falling below the predetermined maximum temperature (e.g. by a threshold amount). For example, it may be that a (typically integral) thermostat associated with each said heater is configured to change a state of (e.g. close or open) a or the switch responsive to a determination that the measured temperature has fallen below the predetermined maximum temperature (e.g. by a threshold amount) to thereby turn on (or increase the electrical current flowing through one or more heating elements of) the heater.

It may be that one or more or each of the heaters comprises one or more electrically powered heating elements having positive thermal coefficients of resistance (PTC), i.e. heating elements having electrical resistances which increase upon heating. It may be that the method further comprises self-regulating the temperature of the said heating elements by increasing the electrical resistance of the said heating elements responsive to an increase in the temperature thereof. It may be that the method comprises reducing the electrical current flowing through the said heating elements for a given voltage across it by for example at least 25%, more preferably at least 50%, more preferably at least 70%, for example at least 90%, responsive to the temperature of the heating element exceeding a threshold temperature, as compared to the electrical current flowing through the heating element when that voltage is applied across it at a reference temperature (e.g. the reference temperature may be for example 25° C.).

The preferred and optional features discussed above are preferred and optional features of each aspect of the invention to which they are applicable. For the avoidance of doubt, the preferred and optional features of the first, second, third, fourth and fifth aspects of the invention may also be preferred and optional features in relation to the other aspects of the invention, where applicable.

DESCRIPTION OF THE DRAWINGS

An example embodiment of the present invention will now be illustrated with reference to the following Figures in which:

FIGS. 1a and 1b are sectional views of a deployable mast of a submarine in the retracted and deployed positions respectively, the deployable mast comprising a snorkel valve housed in a protective fairing and mounted on a telescopically extendable air induction tube;

FIG. 2 is a plan section view of the deployable mast of FIG. 1;

FIG. 7A is a detailed perspective view of the underside of the snorkel valve of FIGS. 1 to 5 with an alternative valve body having six cartridge heaters embedded within it;

FIG. 7B is the perspective view of FIG. 7A but does not show features typically hidden from view; and FIG. 8 is an electrical circuit diagram showing the cartridge heaters connected in parallel with each other and with an electrical power source.

DETAILED DESCRIPTION OF AN EXAMPLE EMBODIMENT

Figure 3:
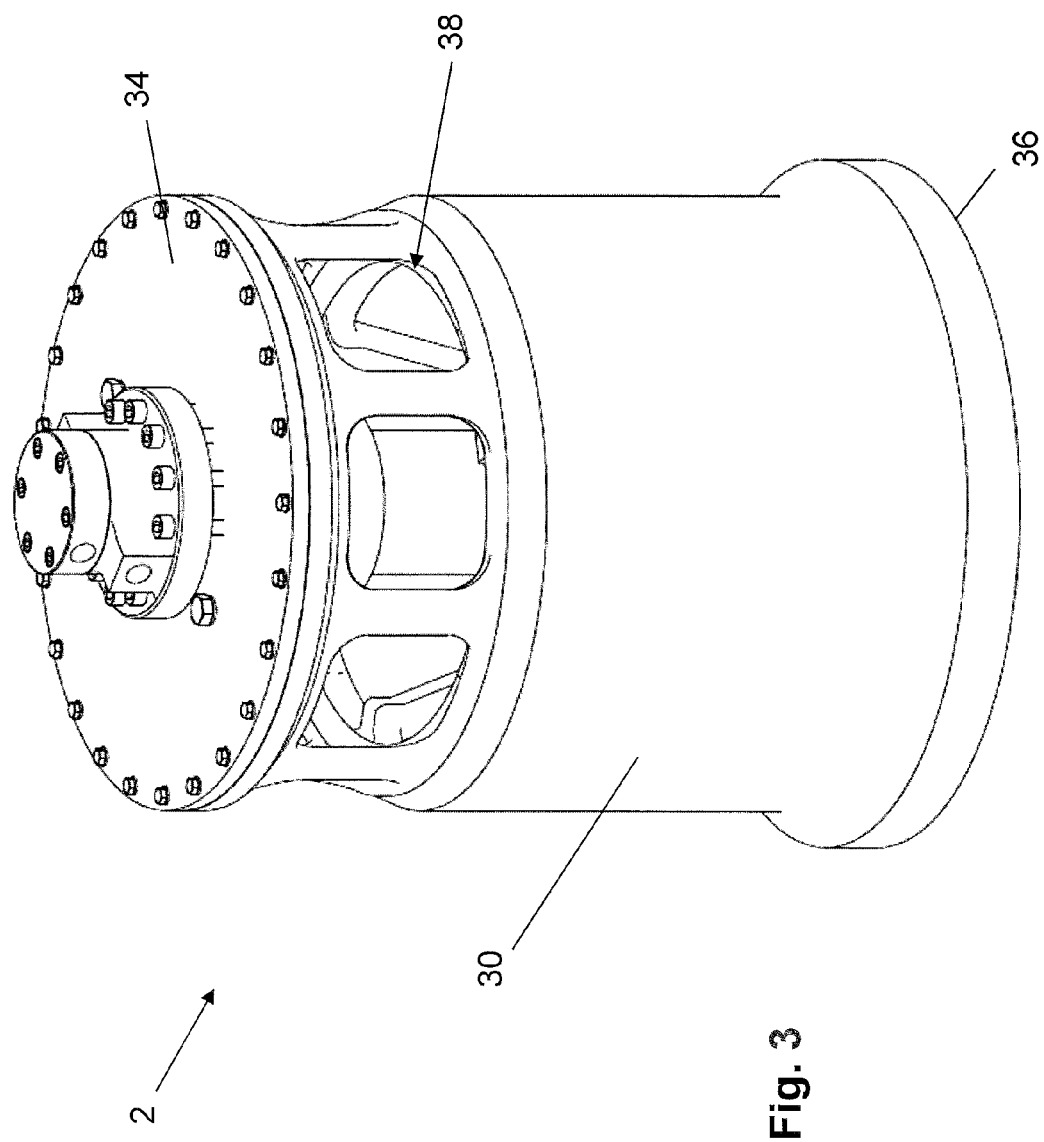
FIG. 3 is a perspective view of the snorkel valve of FIGS. 1 and 2.

FIGS. 1a and 1b are sectional views through a deployable mast assembly 1 for drawing air into a submarine when submerged in water at snorkelling depths, the deployable mast assembly comprising an active snorkel valve 2 mounted to a telescopically extendable and retractable air induction tube 4. The air induction tube 4 comprises a fixed first portion 5 housed in a mast housing 6, and an extendable second portion 7 telescopically extendable and retractable between a retracted position (see FIG. 1a) in which it (or at least a majority of the extendable second portion 7) is telescopically housed in the first portion 5 and an extended position (see FIG. 1b) in which the extendable second portion 7 extends upwards from and out of the first portion 5. The air induction tube 4 comprises an extendable third portion 8 telescopically extendable and retractable between a retracted position (see FIG. 1a) in which (or at least a majority of the extendable third portion 8) is telescopically housed in the extendable second portion 7 and an extended position (see FIG. 1b) in which the extendable third portion 8 extends upwards from and out of the second portion 7. The extension and retraction of the extendable second portion 7 is effected by a first hydraulic actuator and the extension and retraction of the extendable third portion 8 is effected by a second hydraulic actuator. Both the first and second actuators are controlled by a controller 9 (which is typically housed within a pressure hull of the submarine).

The first hydraulic actuator comprises a first rod 10a reciprocating within a first hydraulic cylinder 11a, one (upper) end of the rod 10a being fixedly coupled to the second portion 7 of the mast 4. The first rod 10a comprises a first hydraulic piston (not shown) having first and second driving surfaces extending radially outwards from the rod 10a to (typically sealingly) engage an inner surface of the first hydraulic cylinder. The first hydraulic cylinder comprises a first port for receiving pressurised hydraulic fluid to drive the first (lower) driving surface of the hydraulic piston in order to drive the rod 10a, and thus the second portion 7, from the retracted position up (in the view of FIGS. 1a, 1b) and out of the first portion 5 to the extended position. The first hydraulic cylinder comprises a second port for receiving pressurised hydraulic fluid to drive the second (upper) driving surface of the hydraulic piston in order to drive the rod 10a, and thus the second portion 7, from the extended position down (in the view of FIGS. 1a, 1b) and into the first portion 5 to the retracted position.

The second hydraulic actuator comprises a second rod 10b reciprocating within a second hydraulic cylinder 11b, one (upper) end of the rod 10b being fixedly coupled to the third portion 8 of the mast 4. The second rod 10b comprises a second hydraulic piston (not shown) having first and second driving surfaces extending radially outwards from the rod 10b to (typically sealingly) engage an inner surface of the second hydraulic cylinder. The second hydraulic cylinder comprises a first port for receiving pressurised hydraulic fluid to drive the first (lower) driving surface of the second hydraulic piston in order to drive the rod 10b, and thus the third portion 8, from the retracted position up (in the view of FIGS. 1a, 1b) and out of the second portion 7 to the extended position. The second hydraulic cylinder comprises a second port for receiving pressurised hydraulic fluid to drive the second (upper) driving surface of the second hydraulic piston in order to drive the rod 10b, and thus the third portion 8, from the extended position down (in the view of FIGS. 1a, 1b) and into the second portion 7 to the retracted position.

The second actuator is configured to provide fine control of the height of the air induction tube 4 (e.g. relative to a sail of a submarine to which it is coupled) by controlling the extent to which the third portion 8 extends out of the second portion 7. This enables the extent to which the tube 4 extends above the water surface to be controlled in use. In this case, it will be understood that the third portion 8 has more than one "extended position". Indeed, the third portion 8 typically has a continuous range of extended positions between the retracted position and a fully extended position.

It may be that the first actuator is configured to assist in the provision of fine control of the height of the air induction tube 4 by changing the extent to which the second extendable portion 7 extends out of the first portion 5. However, more typically the second extendable portion 7 remains at a fixed (extended) position relative to the first portion 5 and only the second actuator is used to provide fine control of the height of the air induction tube 4 by adjusting the extent to which the third portion 8 extends out of the second portion 7.

It will be understood that, in alternative embodiments, the first and second rods 10a, 10b may be driven by an electrical actuator rather than a hydraulic actuator.

The active snorkel valve 2 is mounted on, and is in fluid communication with, an upper end of the extendable third portion 8 of the air induction tube 4. The active snorkel valve 2 (and typically the extendable third portion 8) is housed within a tubular protective fairing 12 (whether the extendable second portion 7 is extended or retracted). The protective fairing 12 has opposite proximal and distal ends 13, 14, the proximal end 13 being closer to the first portion 5 than the distal end 14 is to the first portion 5 at least when the third portion 8 is in the (fully) extended position, the distal end 14 being remote from the first portion 5 when the extendable third portion 8 is in the extended position.

The fairing 12 has an upstream leading (with respect to the principle direction of travel of the submarine to which the mast assembly 1 is coupled, indicated on FIGS. 1a, 1b by an arrow) surface 16 and a downstream trailing (with respect to the principle direction of travel of the submarine, indicated on FIGS. 1a, 1b by an arrow) surface 18 opposite the upstream leading surface 16. The downstream surface 18 of the fairing 12 comprises an air inlet port 20, which is provided to receive air into the fairing 12 when the submarine is in snorkelling mode. The air inlet port 20 is provided adjacent to, and axially offset just below, the distal end 14 of the fairing 12. Typically, a grill (not shown) is provided over the air inlet port 20 to prevent (relatively large) objects from entering the air inlet port 20.

FIG. 2 is a plan sectional view of the protective fairing 12. The plan cross section of the fairing 12 has a hydrodynamic shape having a rounded (upstream) leading edge 16, a straight (downstream) trailing edge 18 (comprising the air inlet port 20) and a rounded middle portion 22 extending between the rounded leading edge 16 and the straight trailing edge 18, the middle portion 22 having a greater width (perpendicular to the principle direction of travel of the submarine, also shown in FIG. 2 by an arrow) than the (upstream) leading edge 16 and the (downstream) trailing edge 18.

When the submarine is snorkelling, the second and third portions 7, 8 of the mast are typically extended such that the air inlet port 20 of the fairing 12 extends above the water surface. Air can then be drawn into the submarine through the air inlet port 20, for example to enable internal combustion in a diesel engine. However, the ingress of (sea) water to the air induction tube must be controlled as the height of the water surface relative to the air inlet port 20 can change rapidly and without warning (e.g. due to the presence of peaks and troughs in waves propagating at the water surface). The active snorkel valve 2 is positioned and configured to control the flow of fluid (e.g. air and water) from the air inlet port 20 of the fairing 12 to the air induction tube 4.

Figure 4:
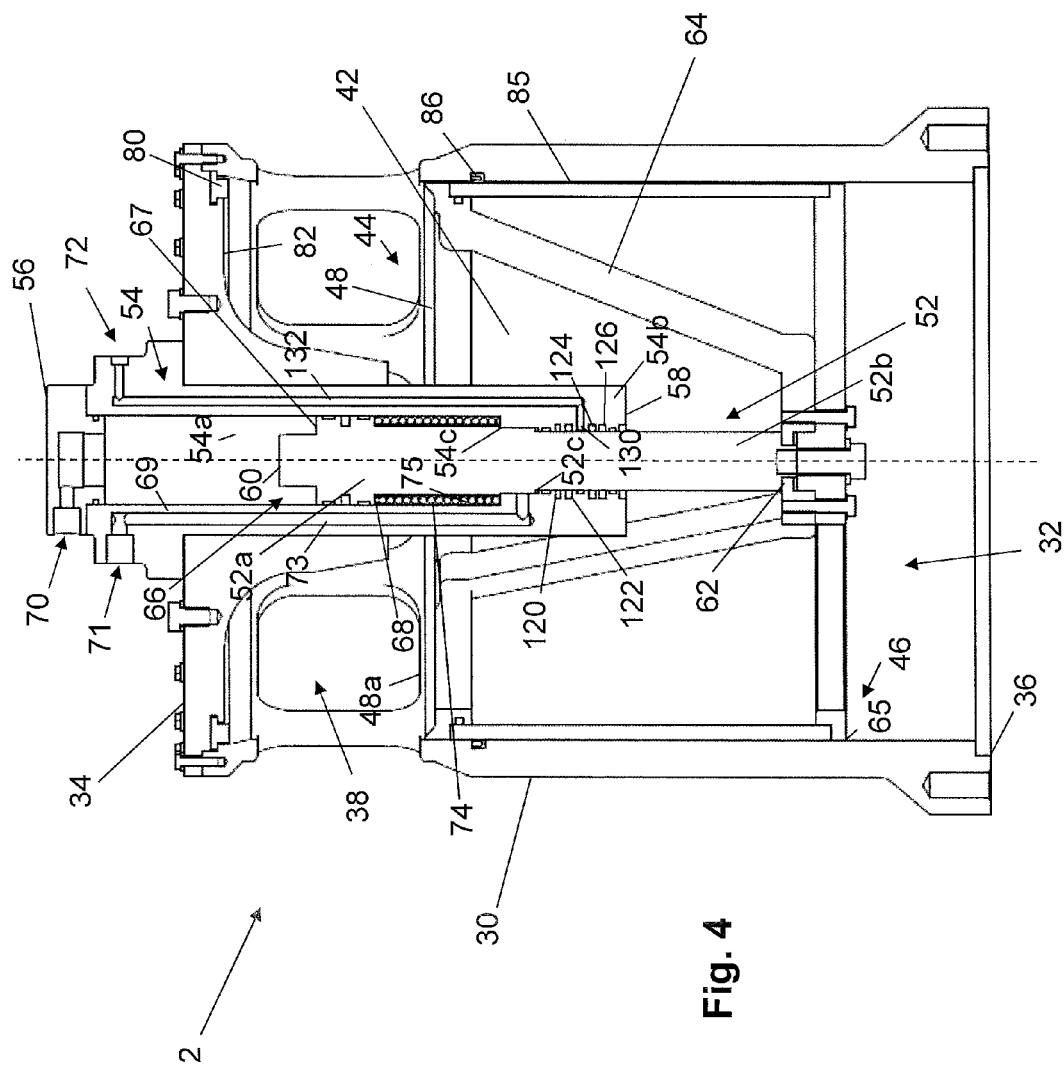
FIG. 4 is a sectional view of the snorkel valve of FIGS. 1 to 3.
Figure 5:
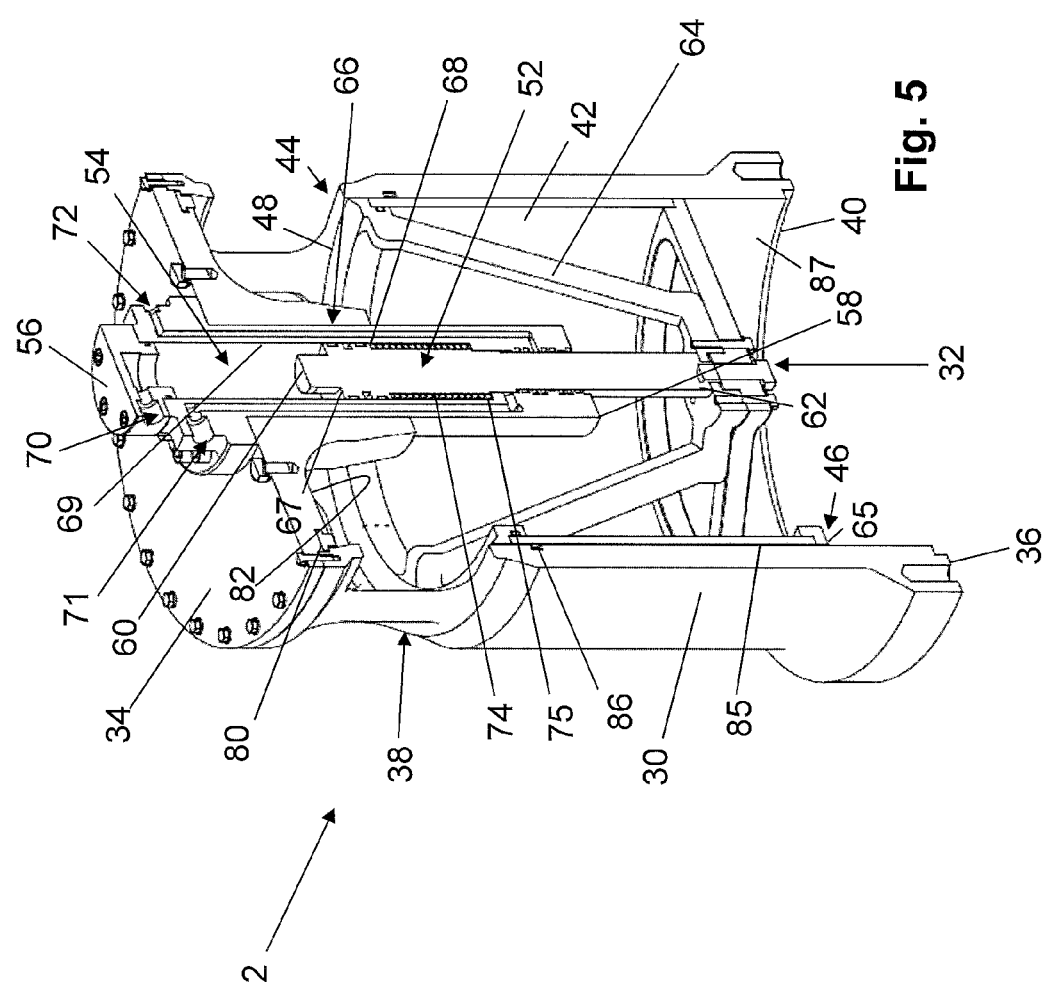
FIG. 5 is a perspective sectional view of the snorkel valve of FIGS. 1 to 4.

FIGS. 3-5 show the active snorkel valve 2 in more detail, FIG. 3 being a perspective view, FIG. 4 being a sectional view and FIG. 5 being a perspective sectional view. The active snorkel valve 2 comprises a tubular valve body 30 which defines an inner bore 32. The tubular valve body 30 has a first (axial) end 34 opposite a second (axial) end 36, the second (axial) end 36 being fixedly mounted to an upper end of the extendable second portion 7 of the air induction tube 4. A plurality of valve inlets 38 are provided in the tubular valve body 30 adjacent to, and axially offset just below, its first (axial) end 34. The valve inlets 38, which extend (and provide fluid communication) between outer and inner surfaces of the tubular body 30 (the inner surface defining the inner bore 32), are distributed circumferentially around the perimeter of the tubular body 30 adjacent to the air inlet port of the fairing 12.

At a lower end, the inner bore 32 terminates at an axial opening 40 which acts as a valve outlet. The valve outlet 40 is co-axial and concentric with the tubular valve body 30 and with the inner bore 32.

The snorkel valve 2 further comprises a tubular (cylindrical) sleeve 42 having a first (axial) end 44 and a second (axial) end 46 opposite the first (axial) end 44. The tubular sleeve 42 is typically formed from carbon fibre reinforced plastic (CFRP) comprising carbon fibres impregnated within a set matrix. The first end 44 of the sleeve 42 comprises a (first) sleeve protector 48 which typically comprises a metallic ring (but they could alternatively be formed from other materials, such as an elastomer).

The sleeve 42 (together with the sleeve protector 48) is slidable along a sliding axis (shown by the dotted line in FIG. 4) between a closed position and an open position. The sleeve 42 is carried by a rod 52 which reciprocates in a hydraulic cylinder 54 of a hydraulic actuator and is guided along the sliding axis by bearings. The hydraulic cylinder 54 has a first (axial) end 56 which protrudes from the first (axial) end 34 of the tubular valve body 30 and a second (axial) end 58 opposite the first (axial) end 56 which extends into the inner bore 32. The cylinder 54 has a first portion 54a extending from the first axial end 56 of the cylinder 54 and a second portion 54b extending between the first portion 54a and the second end 58 of the cylinder 54, the first portion having a first inner diameter and the second portion having a second inner diameter which is less than the first inner diameter.

The rod 52 has a first (axial) end 60 and a second (axial) end 62 opposite the first (axial) end 60. The first (axial) end 60 is provided in the cylinder 54, while the second (axial) end 62 protrudes out of an axial opening in the hydraulic cylinder 54 into the inner bore 32 (at, and between, the closed position and the open position of the sleeve 42). The rod 52 has a first portion 52a extending between the first end 60 and a second portion 52b, the second portion 52b extending between the first portion 52a and the second end 62. The second (axial) end 62 of the rod 52 is fixedly coupled to the sliding sleeve 42 by a bracket 64 (which is typically fastened to both the rod 52 and the sleeve 42) which transfers opening and closing forces from the actuator rod 52 to the sleeve. In the illustrated embodiment, the second end 46 of the sleeve is covered by a portion 65 of the bracket 64. The portion 65 of the bracket 64 may also function as a (second) sleeve protector for protecting the second end 46 of the sleeve (see below).

The cylinder 54 is provided with a stepped portion 54c between its first and second portions 54a, 54b and the rod 52 is provided with a corresponding stepped portion 52c between its first and second portions 52a, 52b. The stepped portion 52c of the rod 52 is configured to engage the stepped portion 54c of the cylinder 54 when the sleeve reaches the open position to thereby prevent the continued sliding of the rod 52 (and thus the sleeve) within the cylinder 54 in the opening (downward in the view of FIG. 4) direction. The stepped portion 54c of the cylinder 54 thus acts as a valve stop for preventing the rod from sliding out of the hydraulic cylinder 54. Preferably a resilient (e.g. elastomeric) ring is provided between (typically on the stepped portion 54c of the cylinder) the stepped portions 52c, 54c of the rod 52 and the cylinder 54 so as to damp the engagement of the said stepped portions 52c, 54c.

The rod 52 further comprises a hydraulic piston 66 having axially offset first and second driving surfaces 67, 68 vertically adjacent to its upper end 60 which extend radially outwards from the rod 52 into sealing engagement with a tubular wall 69 of the hydraulic cylinder 54 (and which are housed in the hydraulic cylinder 54 at and between the closed position and the open position of the sleeve 42). The first driving surface 67 is closer to the first (axial) end 60 of the rod 52 than the second driving surface 68 is to the first (axial) end 60 of the rod 52. The second driving surface 68 is typically provided closer to the second (axial) end 62 of the rod 52 than the first driving surface 67 is to the second axial end 62 of the rod 52.

The tubular wall 69 of the hydraulic cylinder 54 comprises first, second and third hydraulic fluid ports 70, 71, 72 (vertically) adjacent to (and axially offset from) the first end 56 of the cylinder 54. The first hydraulic fluid port 70 is provided in fluid communication with the first driving surface 67. The second hydraulic fluid port 71 is provided in fluid communication with the second driving surface 68 via a channel 73 extending axially along (and within) the tubular wall 69.

A biasing spring 74 is referenced between the second driving surface 68 and a lower, inner surface 75 of the cylinder 54 adjacent to its second end 58 and is configured (e.g. held in compression between the cylinder 54 and the second driving surface 68) to bias the sleeve 42 towards the closed position in which the sleeve 42 covers the valve inlets 38 to thereby inhibit the flow of fluid (especially water) into the inner bore 32 through the valve inlets 38. In the closed position of the sleeve 42, a sealing surface of the (first) sleeve protector 48 (acting as a first sealing surface) engages a first seal 80 comprised in a recess provided in an upper axial end face 82 of the inner bore 32. As shown most clearly in FIG. 4, the first seal 80 comprises a sealing ring having a T-shaped profile when viewed in section (parallel to the sliding axis). It will be understood that the (first) sleeve protector 48 protects the upper end 44 of the sleeve 42 when it engages the first seal 80 when the valve closes.

An outer surface 85 of the sleeve 42, acting as a second sealing surface, also engages a second (lip) seal 86 comprised within a recess in an inner surface 87 of the valve body 30. The second seal 86 is a sealing ring having a U-shaped profile when viewed in section parallel to the sliding axis and is biased towards the outer surface 85 of the sleeve 42. The second seal 86 may be inherently resilient and/or a biasing spring may be provided in the U-shaped profile, the biasing spring biasing a portion of the U-shaped profile into sealing engagement with the outer surface 85 of the sleeve 42. Typically the U-shaped profile comprises (radially) inner and outer parallel (or substantially parallel) arms extending from a bridge extending between ends thereof, the biasing spring biasing the inner parallel arm into sealing engagement with the sliding sleeve 42. This ensures that the second seal 86 and the sliding sleeve 42 are in sealing engagement when the sleeve 42 is in the closed position. The outer parallel arm typically engages the valve body 30.

The sealing engagement between the first sealing surface of the sleeve 42 and the first seal 80 prevents (or substantially prevents or at least restricts) any water which leaks through any gaps between the sleeve 42 and the valve inlets 38 from passing into the air induction tube 4 along a path extending between the sleeve 42 and the first end 82 of the inner bore 32. The sealing engagement between the second sealing surface of the sleeve 42 and the second seal 86 prevents (or at least restricts) any water which leaks through any gaps between the sleeve 42 and the valve inlets 38 from passing into the air induction tube 4 along a path extending between the sleeve 42 and the valve body 30. Accordingly, when the air inlet port 20 of the fairing 12 is submerged below the water surface the sleeve 42 can be moved (or held in) to the closed position, and the sleeve 42, together with the first and second seals 80, 86 prevents (or at least restricts) water from entering the air induction tube 4.

As most clearly shown in FIG. 4, the sleeve protector 48 comprises a ridge which tapers down in thickness as it extends from the sleeve 42 towards the first seal 80 to form a sealing ridge 48a. The sealing ridge thus comprises a "knife edge" seal which engages the first seal 80 in the closed position which tends to clear any obstructions to the sleeve 42 moving to the closed position during valve closure and which will not inhibit the sleeve from sliding to the open position during valve opening.

In the open position, the sleeve 42 is slid vertically downwards (in the view of FIG. 4) to uncover the inlets 38, thereby allowing fluid (especially air) to flow into the air induction tube 4 via the inlets 38 and the outlet 40. As indicated above, the interaction between the stepped portions 52c, 54c of the rod 52 and the cylinder 54 prevents the rod 52, and thus the sleeve, from sliding further within the cylinder in an opening direction past the open position. Referring back now to FIGS. 1a, 1b, it will be understood that, in addition to or as an alternative to the stopping arrangement provided between the rod 52 and the cylinder 54, the extendable third portion 8 of the air induction tube 4 may be provided with a thickness which partially overlaps with the valve outlet 40, thereby providing an annular valve stop which prevents the sleeve 42 from exiting the inner bore 32 when in the (fully) open position. In this case, the portion 65 of the bracket 65 covering the lower end of the sleeve acts as a second sleeve protector to protect the lower end of the sleeve 42 when it engages the said valve stop when in the (fully) open position. Again, preferably, a (e.g. elastomeric) cushioning ring is provided on the annular stop. It will be understood that the portion 65 of the bracket may be a separate component fastened or bonded to the bracket 64 or to the lower end of the sleeve 42, or it may be integrally formed with the bracket 64.

As indicated above, the sleeve 42 is (passively) biased towards the closed position by the biasing spring 74. A further, active bias may be provided by pressurised hydraulic fluid fed to the second driving surface 68 of the piston which pushes the second driving surface 68 (and thus the rod 52, thus the sleeve 42) in a vertically upwards direction in the view of FIGS. 1-5 (i.e. towards the closed position).

Figure 6:
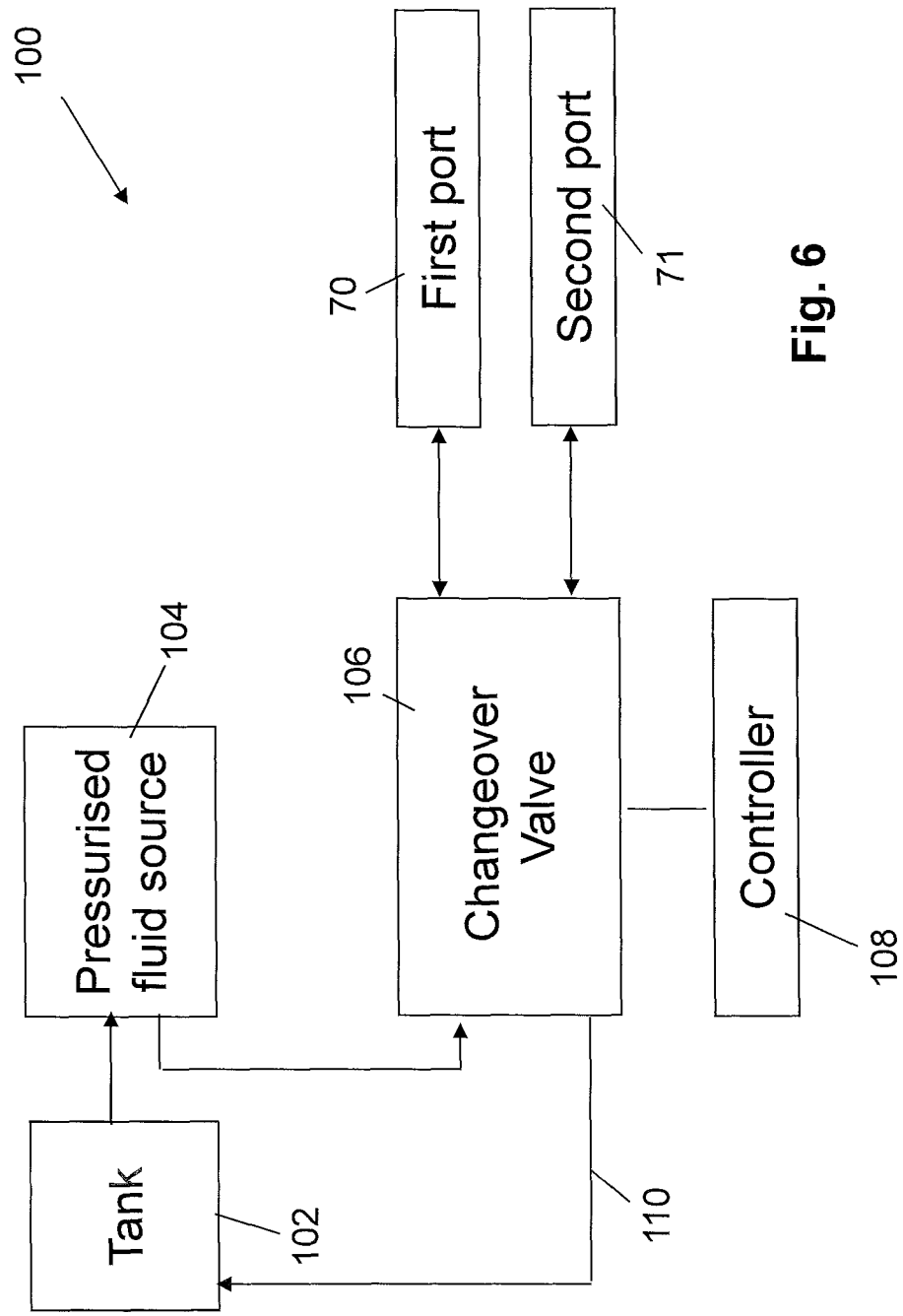
FIG. 6 is a block diagram of a control system of the snorkel valve of FIGS. 1 to 5.

FIG. 6 is a block diagram of a hydraulic system 100 for operating the valve 2. The hydraulic system 100 comprises a hydraulic fluid tank 102 fluidly connected to a pressurised hydraulic fluid source 104 (e.g. a hydraulic pump). The pressurised hydraulic fluid source 104 provides pressurised hydraulic fluid (typically pressurised hydraulic liquid) to the hydraulic cylinder 54 via a changeover valve 106. The changeover valve 106, which is controlled by a controller 108, has a first (opening) mode in which pressurised hydraulic fluid is provided from the pressurised fluid source 104 to the first hydraulic port 70 of the cylinder 54 and the second hydraulic port 71 is connected to a return line 110 which is fluidly connected to the tank 102. The changeover valve 106 has a second (closing) mode in which pressurised fluid is provided to the second hydraulic port 71 of the cylinder 54 from the pressurised fluid source 104 and the first hydraulic port is connected to the return line 110 to the tank 102.

In order to move the sleeve 42 from the closed position to the open position, the controller 108 configures the changeover valve 106 in the first, opening mode. This causes the second hydraulic fluid port 71 to be disconnected from the pressurised fluid source 104 and connected to the return line 110, and the first hydraulic fluid port 70 to be connected to the pressurised fluid source 104. Pressurised hydraulic fluid is then provided by the pressurised hydraulic fluid source 104 to the first hydraulic fluid port 70 which drives the first driving surface 67 down towards the open position against the bias of the spring 74. As the rod 52 slides down the cylinder 54 towards the open position, any hydraulic fluid between the second driving surface 68 and the second end 75 of the cylinder 54, which is no longer pressurised, is driven out of the cylinder 68 through the axial channel 73 and the second hydraulic fluid port 71.

In order to move the sleeve 42 from the open position back to the closed position, the controller 108 configures the changeover valve 106 in the second, closing mode. This causes the first hydraulic fluid port 70 to be disconnected from the pressurised fluid source 104 and connected to the return line 110, and the second hydraulic fluid port 71 to be connected to the pressurised fluid source. Thus, pressurised hydraulic fluid enters the cylinder through the second port 71 and drives the second driving surface 68 up towards the closed position, aided by the biasing force of the spring 74. As the rod 62 slides up the cylinder 54 towards the closed position, any hydraulic fluid (which is no longer pressurised) between the first driving surface 67 and the upper end of the cylinder is forced out of the cylinder through the first port 70.

It will be understood that, instead of a single changeover valve, a plurality of valves may be provided to achieve the same functionality. It will also be understood that the controller 108 may be the same or a different controller from controller 9 used to extend and retract the second and third portions 7, 8 of the mast 4. The controllers 9, 108 are typically comprised in microprocessors or microcontrollers.

Referring back to FIG. 4, a pair of axially offset (i.e. offset along a longitudinal axis of the rod) annular oil seals 120, 122 are provided around the rod 52 to prevent (or substantially prevent or at least restrict) hydraulic fluid from leaking out of the cylinder 54 into the valve body 30 (the rod 52 extending through the annuluses of the oil seals 120, 122). A pair of axially offset (i.e. offset along a longitudinal axis of the rod) water seals 124, 126 are provided around the rod 52 to prevent, or substantially prevent or at least restrict, (sea) water from entering the hydraulic cylinder 54 from the valve body 30 (the rod 52 extending through the annuluses of the water seals 124, 126). The water seals 124, 126 are provided vertically below the oil seals in the view of FIG. 4. That is, the oil seals 120, 122 are provided closer to the hydraulic cylinder 54 than the water seals 124, 126 are to the hydraulic cylinder 54. The rod 52 is slidable relative to the seals 120-126 when the sleeve 42 moves between the open and closed positions.

A dirty water drain 130 is provided axially between the oil and water seals. The dirty water drain 130 is fluidly connected to a dirty water channel 132 which extends vertically upwards through the tubular wall 69 of the hydraulic cylinder 54 to fluidly connect the water drain 130 to the third hydraulic fluid port 72. The dirty water drain 130 allows any (sea) water which leaks around (or through) the water seals 124, 126 to exit the cylinder 54 through the port 72 before it mixes with hydraulic fluid in the cylinder 54. The dirty water drain 130 also allows any hydraulic fluid which leaks around (or through) the oil seals 120, 122 to exit the cylinder 54 before it leaks into the inner bore 32.

Typically a plurality of sensors are provided in electronic communication with the controller 108 such that the active snorkel valve 2 is actuated by the controller 108 automatically in response to signals received from sensors. More specifically, as most clearly shown in FIG. 2, three pairs of sensors 140 and 142, 144 and 146 and 148 and 150 are provided within the (e.g. mounted on an inner surface of a tubular wall of the) fairing 12 in fluid communication with the air inlet port 20, typically between the fairing 12 and the valve body 30. The sensors 140-150 are provided (vertically) adjacent to the air inlet port 20. The sensors are typically provided at a vertical position of the third portion 8 which is within the 10% (typically 5%, more typically 1%) of the height of the mast 4 nearest the distal end 14 of the fairing 12 when the second and third portions 7, 8 are in their fully extended positions such that they can provide an indication to the controller 108 as to whether the air inlet port 20 is submerged below the water surface.

A (forward) pair of sensors 140, 142 is provided nearer to the leading edge 16 of the fairing 12 than to the trailing edge 18. Aft pairs of sensors 144, 146 and 148, 150 are provided nearer to the trailing edge 18 of the fairing 12 than to the leading edge 16. The sensors 140-150 may alternatively be provided on an external surface of the fairing 12. The forward and aft sensors 140-150 are typically provided at similar vertical locations; typically two or more (more typically three or more or four or more) of the sensors 140-150 are positioned with some vertical overlap. Typically, the sensors of each pair are provided adjacent to each other.

Each pair of sensors 140-150 typically comprises sensors of different types. For example, the sensors within each pair may comprise different types of sensor from the following group of sensor types: water sensor; pressure sensor; microwave water level sensor. As well as providing redundancy, another benefit of providing different types of sensor within each pair is that the controller 108 can be configured to compare signals received from the sensors of each pair to confirm whether conclusions derived from the sensor signals are accurate, which leads to improved accuracy. For example, a pair of sensors may comprise a water sensor and a pressure sensor. Sea spray incident on the water sensor could lead to a false indication that the air inlet port in the fairing is submerged below the water surface. However as the controller 108 is configured to compare the readings from the water and pressure sensors to check the accuracy of the water sensor reading, the reading from the pressure sensor will indicate that the conclusion derived from the water sensor reading that the sensors are submerged is false.

It will be understood that three single (e.g. water or pressure) sensors may alternatively be provided (instead of three pairs of water and pressure sensors). In other embodiments, different numbers of sensors (or pairs of sensors) may be provided.

The controller 108 is typically provided with a snorkelling mode and a diving mode. In the snorkelling mode, the controller 108 is configured to move the sleeve 42 of the active snorkel valve 2 to the closed position, or to hold the sleeve 42 in the closed position, responsive to an indication from the sensors 140-150 that the air inlet port 20 is submerged below the water surface as discussed above. The controller 108 is also configured (in the snorkelling mode) to move the sleeve 42 to the open position, or to hold the sleeve 42 in the open position, responsive to an indication from the sensors 140-150 that the air inlet port 20 is above the water surface.

In the dive mode, the controller 108 may be configured to move the sleeve 42 from the closed position to the open position to thereby flood the air induction tube 4 with water so as to equalise the pressures on inner and outer surfaces of the tube 4 (to prevent damage to the air induction tube). The controller 108 then moves the sleeve 42 to the closed position when the air induction tube 4 has been flooded (e.g. responsive to a determination that the pressure on the inner surface of the air induction tube equals (or substantially equals) the pressure on the outer surface of the air induction tube, or when the sleeve has been in the open position for a predetermined time period in dive mode). It will be understood that corresponding valves in the pressure hull of the submarine will be closed when the controller 108 enters the dive mode to prevent (or substantially prevent or at least restrict) water from the mast 4 from entering the diesel engine (for example). A pressure relief valve may be provided to ensure that a pressure differential between the inner and outer surfaces of the tube 4 does not exceed a threshold level.

The controller 108 is configured to enter the dive mode (e.g. from the snorkelling mode) responsive to a determination that the depth of a submarine comprising the deployable mast assembly below the water surface exceeds a threshold depth below the water surface. Such a determination can be made from pressure sensor signals for example.

The controller 108 is configured to enter snorkelling mode (e.g. from the dive mode) responsive to a determination that the depth of a submarine comprising the deployable mast assembly below the water surface is less than a or the said threshold depth. When the controller 108 switches from the dive mode to the snorkelling mode, the controller is configured to drain the air induction tube 4 of water before the sleeve 42 of the snorkel valve 2 can be moved from the closed position to the open position.

Typically, one or more heaters (e.g. heating elements) are provided to ensure that the valve can operate reliably even under the extremely low ambient temperatures (e.g. −30° C.) which will be experienced by the valve in use. A first heater may be provided adjacent to the air inlet port 20 so as to heat incoming air, thereby helping to prevent ice from forming. A second heater may be provided on the valve body 30, thereby helping to prevent ice from forming in the valve body 30 which could otherwise cause jamming of the sliding sleeve 42. It may be that the second heater is wrapped around the valve body. For example, the second heater may be a heating element wrapped around the valve body.

In addition, or (more typically) as an alternative to wrapping the second heater around the valve body 30, a plurality of cartridge heaters 200 may be embedded within the valve body 30. FIG. 7A is a perspective view of the underside of the snorkel valve 2 having an alternative valve body 30a which has six cylindrical elongate cartridge heaters 200 (each having a longitudinal axis which extends parallel to the axis along which the sleeve 42 is slidable) embedded between the inner and outer surfaces of the tubular wall of the valve body 30a, the heaters 200 being regularly distributed, and regularly spaced (at 60° intervals) from each other, around the perimeter of the tubular wall of the valve body 30a. It will be understood that although they are shown in FIG. 7A, the heaters 200 would normally be hidden from view as they are embedded within the tubular wall of the valve body 30a (and the tubular wall of the valve body 30a is typically opaque). Some other detailing shown in FIG. 7A (e.g. some of the wiring and junction boxes) would also not normally be visible. This is illustrated by FIG. 7B which does not show features normally hidden from view.

A recess 202 is provided between the second axial end 36 of the tubular wall of the valve body 30a and the inner bore 32, the recess 202 having a recessed surface 204 adjacent to and being set back from the said second axial end 36 towards the first axial end 34 of the tubular wall of the valve body 30a. Six axial bores are drilled from the recessed surface 204 towards the first axial end 34 of the tubular wall of the valve body in a direction parallel to the axis along which the sleeve 42 is slidable at positions distributed, and regularly spaced (at 60° intervals) from each other, around the perimeter of the tubular wall of the valve body 30a, the axial bores being provided between the inner and outer surfaces of the tubular wall of the valve body 30a. The axial bores have openings extending through the recessed surface 204 and closed ends opposite the openings. The closed ends are provided as close to the first axial end 34 of the tubular wall of the valve body 30*a* as possible without compromising the structural integrity of the valve body 30*a*. It may be that the closed ends of one or more of the axial bores are provided closer to the first axial end 34 than the valve inlets 38 are to the first axial end 34, so that the said axial bore(s) do not extend into the valve inlets 38 (depending on the position of the axial bore(s) around the perimeter of the tubular wall of the valve body). Cylindrical cartridge heaters 200 (typically having diameters of around 4-6 mm, although any suitable diameters may be provided) are then inserted into the axial bores through their openings such that the cartridge heaters 200 engage the inner walls of the axial bores (preferably around their perimeters to maximise the surface area of the tubular wall in contact with the cartridge heaters 200).

It is noted for completeness that, in the embodiment of FIGS. 7A, 7B, the external surface of the tubular wall of the valve body 30*a* is provided with an outer ring 220 which assists in the mounting of the valve body 30*a* onto the air induction tube 4.

As illustrated by the circuit diagram of FIG. 8, the cartridge heaters 200 are electrically connected in parallel with each other and with an electrical power source (provided in the submarine) by way of a terminal box, which is provided in the deployable mast assembly. By connecting the cartridge heaters 200 in parallel, it can be ensured that in the event of failure of one or more of the cartridge heaters 200, the others can remain operational (as opposed to if the heaters 200 were connected in series, where failure of one or more of the heaters 200 could also cause the others to fail). Wiring 208 connecting the cartridge heaters 200 to the terminal box (together with a junction box 206 per cartridge heater 200) is provided on the recessed surface 204. The cartridge heaters 200 and wiring 208 are secured in place by epoxy (not shown) which fills the recess 202 to provide a pressure tight seal around the cartridge heaters 200 (and the axial bores in which they are provided) and the wiring 208.

As also illustrated in the circuit diagram of FIG. 8, the cartridge heaters 200 each comprise an electrically powered heating element 210 and an integral thermostat 212. The heating elements 210 are configured to be always on, with the exception that each of the thermostats is configured to turn off its associated heating element 210 by opening a switch connected in series with the heating element 210 when a temperature measured by the thermostat (which is typically a temperature of the valve body, an ambient temperature or a temperature of the heating element) reaches or exceeds a threshold temperature (e.g. 100° C.). This ensures that the cartridge heaters 200 do not (and indeed the valve body 30*a* does not) overheat. Similarly, the thermostats 212 are configured to turn on their associated heating elements 210 (e.g. by closing a switch connected in series with the heating element 210) when the temperature of the thermostat falls below a threshold temperature (e.g. by a threshold amount).

As a preferred alternative to using thermostats to control the heat output by the heaters 200, the thermostats 212 may be omitted and the heating elements 210 may be formed from a (e.g. ceramic) material (or combination of materials) having an overall positive thermal coefficient of resistance (PTC), i.e. heating elements having electrical resistances which increase upon heating. This allows the PTC heating elements to self-regulate their temperatures. For example, it may be that the PTC heating elements are provided with threshold temperatures above which the electrical current flowing through the heating element 210 for a given voltage across it is significantly reduced (e.g. by, for example at least 25%, more preferably at least 50%, more preferably at least 70%, for example at least 90%) when its temperature exceeds the said threshold temperature as compared to the electrical current flowing through the heating element 210 when that voltage is applied across it at a reference temperature (e.g. the reference temperature may be for example 25° C.). The use of PTC heating elements 210 which self regulate their temperatures is advantageous because it requires less wiring than using thermostats to control the temperatures of the heaters 200, and provides increased reliability as no moving parts (e.g. switches) are required to regulate the temperature.

By embedding the cartridge heaters 200 in the valve body 30*a*, heat is transferred from the cartridge heaters 200 to the valve body 30*a* more efficiently than for example a heater wrapped around the outside of the valve body 30*a* (which would result in much more heat being lost to the environment). Moreover, by providing a plurality of cartridge heaters distributed (typically regularly) around the perimeter of the tubular wall of the valve body, heat can be distributed more evenly throughout the valve body which reduces the possibility of cold spots (and ultimately ice) forming which could otherwise cause jamming of the valve (e.g. ice could form at cold spots which could impede the sliding motion of the sleeve 42).

Although six cartridge heaters 200 are shown in FIGS. 7A, 7B, 8, it will be understood that more or fewer cartridge heaters 200 may be provided.

It will also be understood that the first heater adjacent to the air inlet port may optionally be omitted.

Further modifications and variations may be made within the scope of the invention herein disclosed.

The invention claimed is:

1. A snorkel valve for controlling a flow of fluid into a deployable submarine mast, the snorkel valve comprising:
   a valve body having: a tubular wall having an outer surface and an inner surface on the reverse side of the outer surface, the inner surface defining an inner bore; a valve inlet extending through the tubular wall to fluidly connect the outer surface and the inner bore; and a valve outlet in fluid communication with the inner bore, and
   a sleeve slidable within the said inner bore between a closed position in which it covers the said valve inlet to thereby inhibit water from flowing into the inner bore through the valve inlet, and an open position in which at least a portion of the said valve inlet is uncovered by the sleeve to thereby allow air to flow into the said inner bore through the said valve inlet.

2. The snorkel valve according to claim 1 further comprising a valve seal, the sleeve comprising a sealing surface which sealingly engages the valve seal when the sleeve is in the closed position.

3. The snorkel valve according to claim 2 wherein the valve seal is provided at an axial end of the inner bore, and the sealing surface of the sleeve is provided at an axial end of the sleeve.

4. The snorkel valve according to claim 2 further comprising a second valve seal, the sleeve comprising a second sealing surface which sealingly engages the second valve seal when the valve is in the closed position.

5. The snorkel valve according to claim 4 wherein the inner surface of the tubular wall of the valve body comprises the second seal, and wherein the second sealing surface is an outer surface of a tubular wall of the sleeve.

6. The snorkel valve according to claim 4 wherein the valve inlet is axially between the first and second valve seals.

7. The snorkel valve according to claim 2 wherein the sleeve comprises a sealing ridge comprising the sealing surface.

8. The snorkel valve according to claim 7 wherein the sealing ridge tapers down in thickness towards the sealing surface.

9. The snorkel valve according to claim 1 wherein the sleeve is biased towards the closed position.

10. The snorkel valve according to claim 1 comprising an actively operated actuator configurable to move the sleeve from the closed position to the open position.

11. The snorkel valve according to claim 10 wherein the actively operated actuator comprises a hydraulic actuator.

12. The snorkel valve according to claim 1 wherein the sleeve is selectively actively biased towards the closed position.

13. The snorkel valve according to claim 12, further comprising an actively operated actuator configurable to move the sleeve from the closed position to the open position, wherein the sleeve is actively biased towards the closed position by the actuator.

14. The snorkel valve according to claim 1 further comprising one or more heaters configured to heat the valve body.

15. The snorkel valve according to claim 14 wherein one or more or each of the said one or more heaters comprises one or more heating elements which self-regulate their temperatures by virtue of the fact that their electrical resistances increase upon heating.

16. A deployable submarine mast assembly comprising: an air induction tube and a snorkel valve according to claim 1 mounted on an end of the said air induction tube, the outlet of the snorkel valve being in fluid communication with the said air induction tube.

17. The deployable mast assembly according to claim 16 further comprising one or more sensors in communication with a controller, the controller being configured to move the sleeve to, or hold the sleeve in, the open or closed positions responsive to signals received from the sensors.

18. A submarine comprising the snorkel valve according to claim 1.

19. A submarine comprising the deployable mast assembly according to claim 16.

20. A method of operating a snorkel valve comprised in a deployable mast assembly having an air inlet port, the snorkel valve comprising:
  a valve body having: a tubular wall having an outer surface and an inner surface on the reverse side of the outer surface, the inner surface defining an inner bore; a valve inlet extending through the tubular wall to fluidly connect the outer surface and the inner bore; and a valve outlet in fluid communication with the inner bore, and
  a sleeve slidable within the said inner bore between a closed position in which it covers the said valve inlet to thereby inhibit water from flowing from the air inlet port into the inner bore through the valve inlet, and an open position in which at least a portion of the said valve inlet is uncovered by the sleeve to thereby allow air to flow from the air inlet port into the said inner bore through the said valve inlet,
  the method comprising: moving the sleeve to, or holding the sleeve in, the closed position responsive to a determination that at least a portion of the air inlet port is submerged below a water surface; and moving the sleeve to, or holding the sleeve in, the open position responsive to a determination that the air inlet port is above the said water surface.

* * * * *